(12) United States Patent
Aktas et al.

(10) Patent No.: US 11,091,065 B2
(45) Date of Patent: Aug. 17, 2021

(54) SEATING ASSEMBLY WITH LOAD FLOOR

(71) Applicant: Ford Global Technologies, LLC, Dearborn, MI (US)

(72) Inventors: Macit Aktas, Windsor (CA); Johnathan Andrew Line, Northville, MI (US); Spencer Robert Hoernke, Dundas (CA); Kevin Wayne Preuss, Berkley, MI (US); Deeptej Kudav, Southgate, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 16/735,140

(22) Filed: Jan. 6, 2020

(65) Prior Publication Data

US 2021/0206297 A1 Jul. 8, 2021

(51) Int. Cl.
*B60N 2/20* (2006.01)
*B60N 2/68* (2006.01)
*B60N 2/22* (2006.01)
*B60N 2/06* (2006.01)
*B60N 2/02* (2006.01)

(52) U.S. Cl.
CPC .......... *B60N 2/206* (2013.01); *B60N 2/0232* (2013.01); *B60N 2/06* (2013.01); *B60N 2/2213* (2013.01); *B60N 2/2227* (2013.01); *B60N 2/682* (2013.01); *B60N 2002/0236* (2013.01)

(58) Field of Classification Search
CPC ........ B60N 2/206; B60N 2/0232; B60N 2/06; B60N 2/2213; B60N 2/2227; B60N 2/22; B60N 2/224; B60N 2/682; B60N 2002/0236

USPC .......... 297/344.1, 378.12, 340, 341
See application file for complete search history.

(56) References Cited

U.S. PATENT DOCUMENTS

| | | | | |
|---|---|---|---|---|
| 4,695,094 A | * | 9/1987 | Siebler | B60N 2/3011 297/331 |
| 5,454,624 A | * | 10/1995 | Anglade | B60N 2/0292 297/321 |
| 5,588,707 A | * | 12/1996 | Bolsworth | B60N 2/3013 296/66 |
| 6,070,934 A | * | 6/2000 | Schaefer | B60N 2/206 296/65.09 |

(Continued)

FOREIGN PATENT DOCUMENTS

WO 2009064650 A1 5/2009

*Primary Examiner* — Mark R Wendell
(74) *Attorney, Agent, or Firm* — David Coppiellie; Price Heneveld LLP

(57) ABSTRACT

A vehicle seating assembly includes a seat including a side bracket, a seatback, a displaceable bracket extending between the seatback and the side bracket, a pivotable seatback coupling between the displaceable bracket and the seatback, and a movement assembly operably coupling the displaceable bracket to the side bracket. The movement assembly is positionable between a design position and a fully deployed position to move the displaceable bracket between a first position and a second position, respectively, and to move the pivotable seatback coupling between a primary positon and a secondary position, respectively, wherein, when the pivotable seatback coupling is in a secondary position, the seatback is movable between a forward inclined position and a substantially flat position.

17 Claims, 22 Drawing Sheets

(56) References Cited

U.S. PATENT DOCUMENTS

| | | | |
|---|---|---|---|
| 6,513,875 B1 | 2/2003 | Gray et al. | |
| 6,733,076 B2 * | 5/2004 | Grable | B60N 2/0284 297/362 |
| 7,152,922 B2 | 12/2006 | Garland | |
| 7,419,218 B2 | 9/2008 | Holdampf et al. | |
| 7,651,166 B2 * | 1/2010 | Schwingenschlogel | B60N 2/12 297/378.12 |
| 9,333,885 B2 * | 5/2016 | Verhee | B60N 2/3093 |
| 9,987,955 B2 * | 6/2018 | Ecker | B60N 2/3065 |
| 2005/0017561 A1 * | 1/2005 | Burmeister, III | B60N 2/015 297/354.12 |
| 2009/0001795 A1 * | 1/2009 | Homier | B60N 2/22 297/341 |
| 2010/0283301 A1 * | 11/2010 | Shanmugam | B60N 2/206 297/344.1 |

* cited by examiner

SEATING ASSEMBLY WITH LOAD FLOOR

FIELD OF THE DISCLOSURE

The present disclosure relates to a vehicle seating assembly. More specifically, the present disclosure relates to a vehicle seating assembly that is positionable in various configurations.

BACKGROUND OF THE DISCLOSURE

Vehicle seating assemblies may be arranged in various configurations to enable a vehicle seating assembly to serve various functions in a vehicle.

SUMMARY OF THE DISCLOSURE

According to one aspect of the present disclosure, a vehicle seating assembly includes a seat including a side bracket. The vehicle seating assembly also includes a seatback, a displaceable bracket extending between the seatback and the side bracket, a pivotable seatback coupling between the displaceable bracket and the seatback, and a movement assembly operably coupling the displaceable bracket to the side bracket. The movement assembly is positionable between a design position and a fully deployed position to move the displaceable bracket between a first position and a second position, respectively, and to move the pivotable seatback coupling between a primary position and a secondary position, respectively. When the pivotable seatback coupling is in a secondary position, then the seatback is movable between a forward inclined position and a substantially flat position.

Embodiments of the first aspect of the disclosure can include any one or a combination of the following features:
- the movement assembly includes a drive member and a guide member;
- the drive member includes a rack gear disposed along the side bracket and a pinion gear extending from the displaceable bracket and movable along the rack gear;
- the guide member includes a channel in the side bracket;
- the displaceable bracket includes a pin protruding from the displaceable bracket and extending into the channel;
- the channel includes a cutaway portion extending through the side bracket;
- the rack gear is disposed on an oblong member positionable against a slot in the side bracket;
- the oblong member includes one or more mounting areas for mounting the oblong member to the slot;
- the channel includes a curvature having three segments, wherein the first segment is angled upward, the second segment extends from the first segment and is linear, and a third segment extends from the second segment and is angled upward;
- the curvature of the channel defines a path of the pivotable seatback coupling between the primary position and the secondary position;
- a lock mechanism including a first portion disposed on the displaceable bracket and a second portion disposed on the side bracket, wherein the lock mechanism is in an engaged position when the displaceable bracket is in the first position; and/or
- the first portion of the lock mechanism includes a latch and the second portion of the lock mechanism includes a striker.

According to a second aspect of the present disclosure, a vehicle seating assembly includes a seat frame including a side bracket, a seatback, and a displaceable bracket. The displaceable bracket is operably coupled to the seatback with a pivotable seatback coupling and operably coupled to the side bracket with a movement assembly for adjusting the position of the displaceable bracket between a first position and a second position, thereby adjusting the pivotable seatback coupling between a primary position and the secondary position, such that when the pivotable seatback coupling is in the secondary position, the seatback is movable between a forward inclined position and a substantially flat position.

Embodiments of the second aspect of the disclosure can include any one or a combination of the following features:
- the movement assembly includes a gear assembly that moves the displaceable bracket along a slot in the side bracket;
- the movement assembly includes a channel disposed in the side bracket and a pin extending from the displaceable bracket and movable along the channel;
- the shape of the channel determines the path of the pivotable seatback coupling between the primary position and the secondary position;
- a lock mechanism disposed on the displaceable bracket and engageable with a striker disposed on the side bracket when the displaceable bracket is in the first position;
- a pivotable base coupling defined by a mounting bracket operably coupled to the side bracket, wherein the side bracket is rotatable around the pivotable base coupling to move the seating assembly between a sitting position and a standing position; and/or
- the seating assembly in the standing position is slidable long a track assembly disposed in a vehicle floor.

According to a third aspect of the present disclosure, a seating assembly includes a seat, a seatback, and a displaceable bracket disposed between the seat and the seatback and configured to displace a seatback pivot between a primary position and a secondary position. The displaceable bracket includes an elongated slot including a toothed portion for receiving a pinion gear extending from a displaceable bracket. The displaceable bracket also includes an arcuate channel for receiving a guide pin extending from the disnplaceable bracket for determining a path of the seatback pivot between the primary position and the secondary position. In the secondary position, the seatback is rotatable about the seatback pivot to position the seatback in a substantially flat position above the seat.

Embodiments of the third aspect of the disclosure can include any one or a combination of the following features:
- the toothed portion is disposed on an oblong member, the pinion gear extends from a motor, the pinion gear extends into the slot, and a fastener retains the pinion gear against the toothed portion of the oblong member.

These and other aspects, objects, and features of the present disclosure will be understood and appreciated by those skilled in the art upon studying the following specification, claims, and appended drawings.

DETAILED DESCRIPTION

Figure 1:
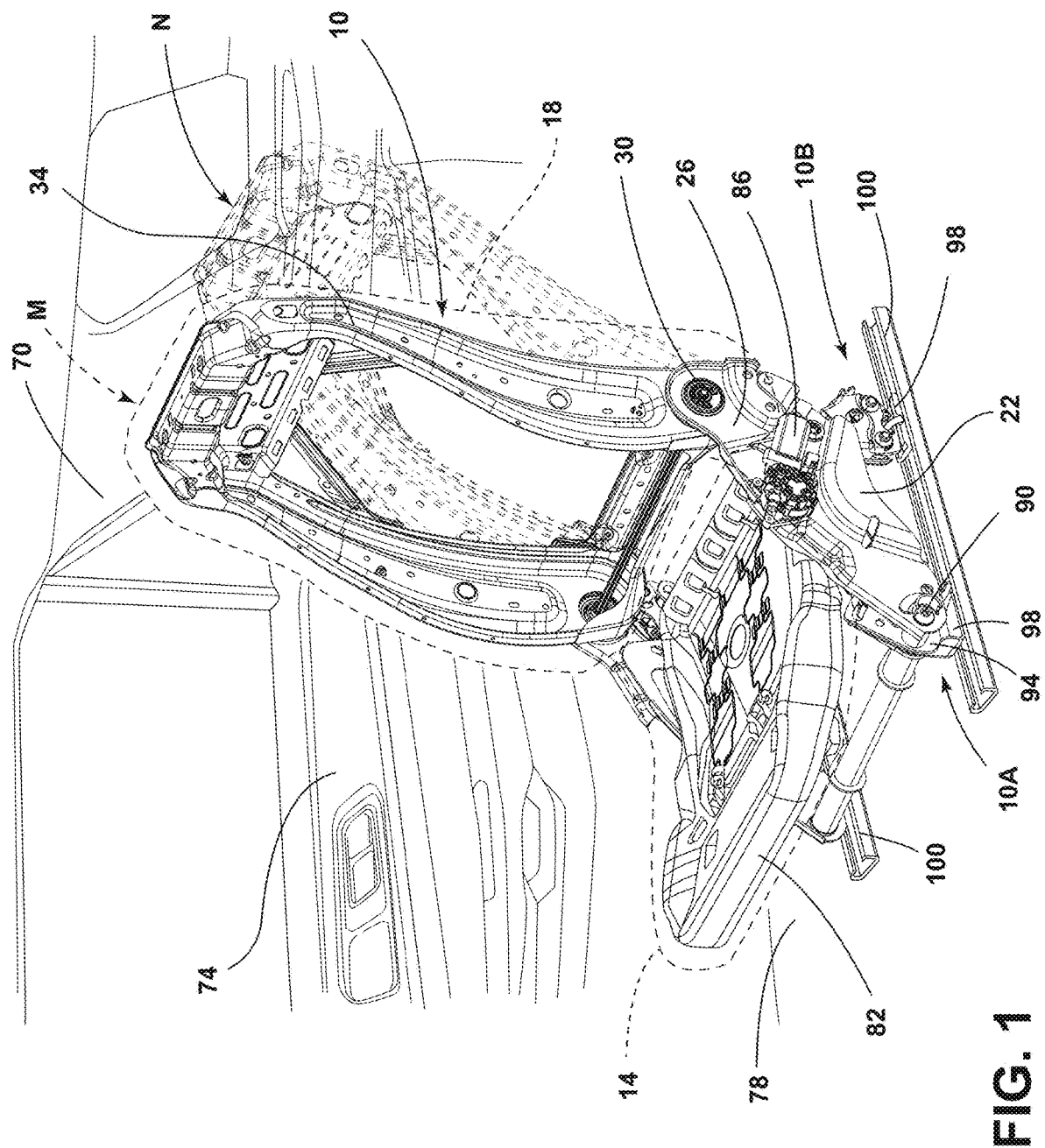
FIG. 1 is a left side perspective view of a seating assembly.

Referring to FIGS. 1-23, a vehicle seating assembly 10 includes a seat 14 including a side bracket 22, a seatback 18, and a displaceable bracket 26 extending between the seatback 18 and the side bracket 22. A pivotable seatback coupling 30 is disposed between the displaceable bracket 26 and the seatback 18. A movement assembly 38 operably couples the displaceable bracket 26 to the side bracket 22. The movement assembly 38 is positionable between a design position E and a fully deployed position F to move the displaceable bracket 26 between a first position A and a second position B and to move the pivotable seatback coupling 30 between a primary position I and a secondary position J. When the pivotable seatback coupling 30 is in the secondary position J, the seatback 18 is movable between a forward inclined position O and a substantially flat position P. The movement assembly 38 may include a gear assembly 42 and a motor 46 arranged to move a pinion gear 50 fixedly coupled to the displaceable bracket 26 along a rack gear 54 fixedly coupled to the side bracket 22. Movement of the pinion gear 50 along the rack gear 54 may move a pin 58 fixedly coupled to the displaceable bracket 26 along a channel 62 in the side bracket 22.

Referring to FIG. 1, a perspective view of the seating assembly 10 in a vehicle 70 is shown. The seating assembly is shown in a substantially upright position M and a rearward reclined position N. The vehicle 70 may include a door 74 and a floor 78. The seating assembly 10 may include a seat 14 and a seatback 18. The seat 14 may include a seat frame 82. The seatback 18 may include a seatback frame 34. The seat frame 82 may include a side bracket 22. The side bracket 22 may be referred to as a B-bracket. A displaceable bracket 26 may extend between the seat frame 82 and the seatback frame 34. A pivotable seatback coupling 30 may operably couple the displaceable bracket 26 to the seatback frame 34. The seatback 18 may be rotatable about the pivotable seatback coupling 30. The pivotable seatback coupling 30 may be referred to as a seatback pivot. A motor 86 may be disposed proximate the displaceable bracket 26. The motor 86 may be actuated to change the positions of the displaceable bracket 26 and the pivotable seatback coupling 30. A pivotable base coupling 90 may be disposed at a front portion 10A of the seating assembly 10. The pivotable base coupling 90 at the front portion 10A of the seating assembly 10 may extend through the side bracket 22 and a mounting bracket 94. The mounting bracket 94 may be attached to rails 98 disposed on a vehicle floor 78. In one example, the rails 98 may be slidable within a track assembly 100 disposed in the vehicle floor 78.

Figures 2A, 2B, 2C:
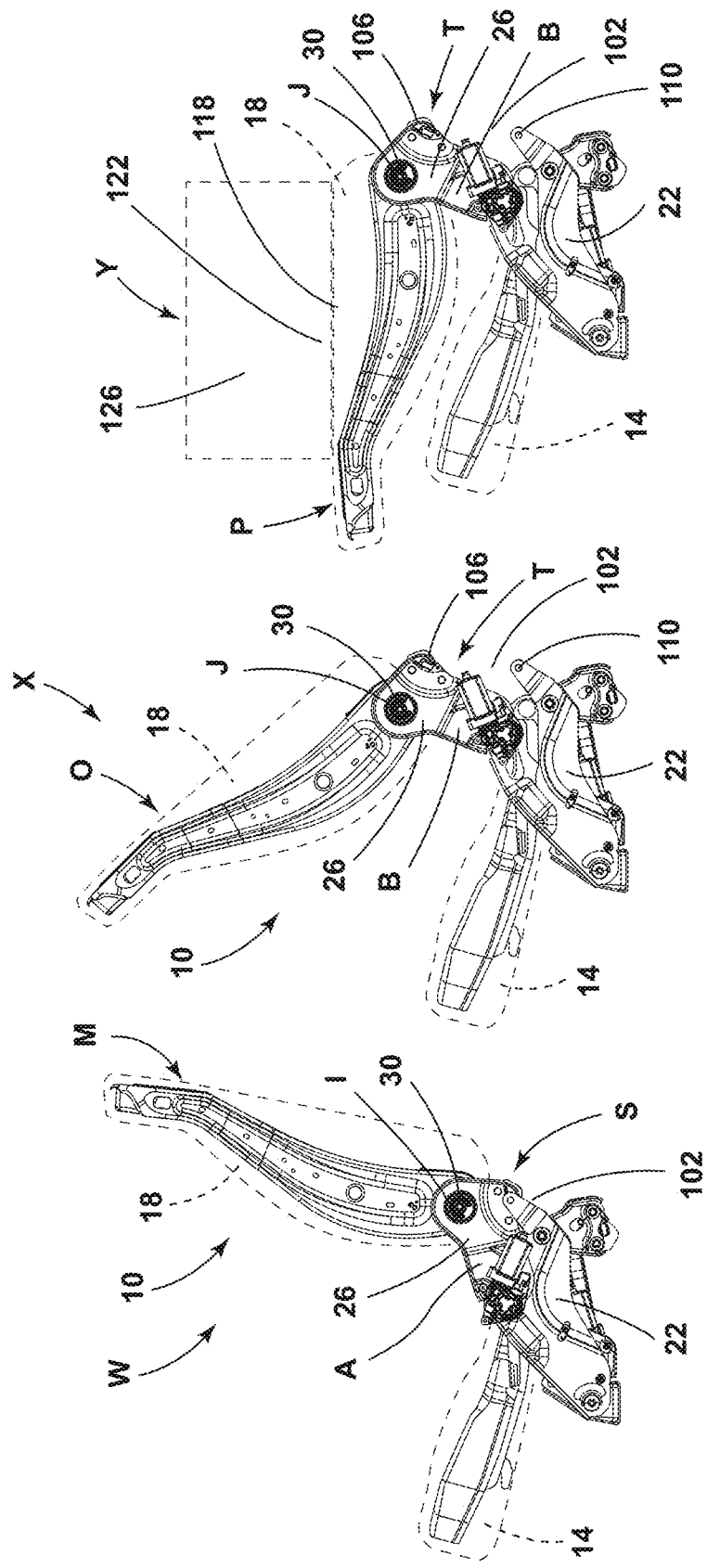
FIG. 2A is a left side elevational view of a seating assembly with the seatback disposed in a substantially upright position, the bracket disposed in a first position, and the pivotable seatback coupling disposed in a primary position.
FIG. 2B is a left side elevational view of a seating assembly with the seatback disposed in a forward inclined position, the bracket disposed in a second position, and the pivotable seatback coupling disposed in a secondary position.
FIG. 2C is a left side elevational view of a seating assembly with the seatback disposed in a substantially flat position, the bracket disposed in a second position, and the pivotable seatback coupling disposed in a secondary position.
Figure 3:
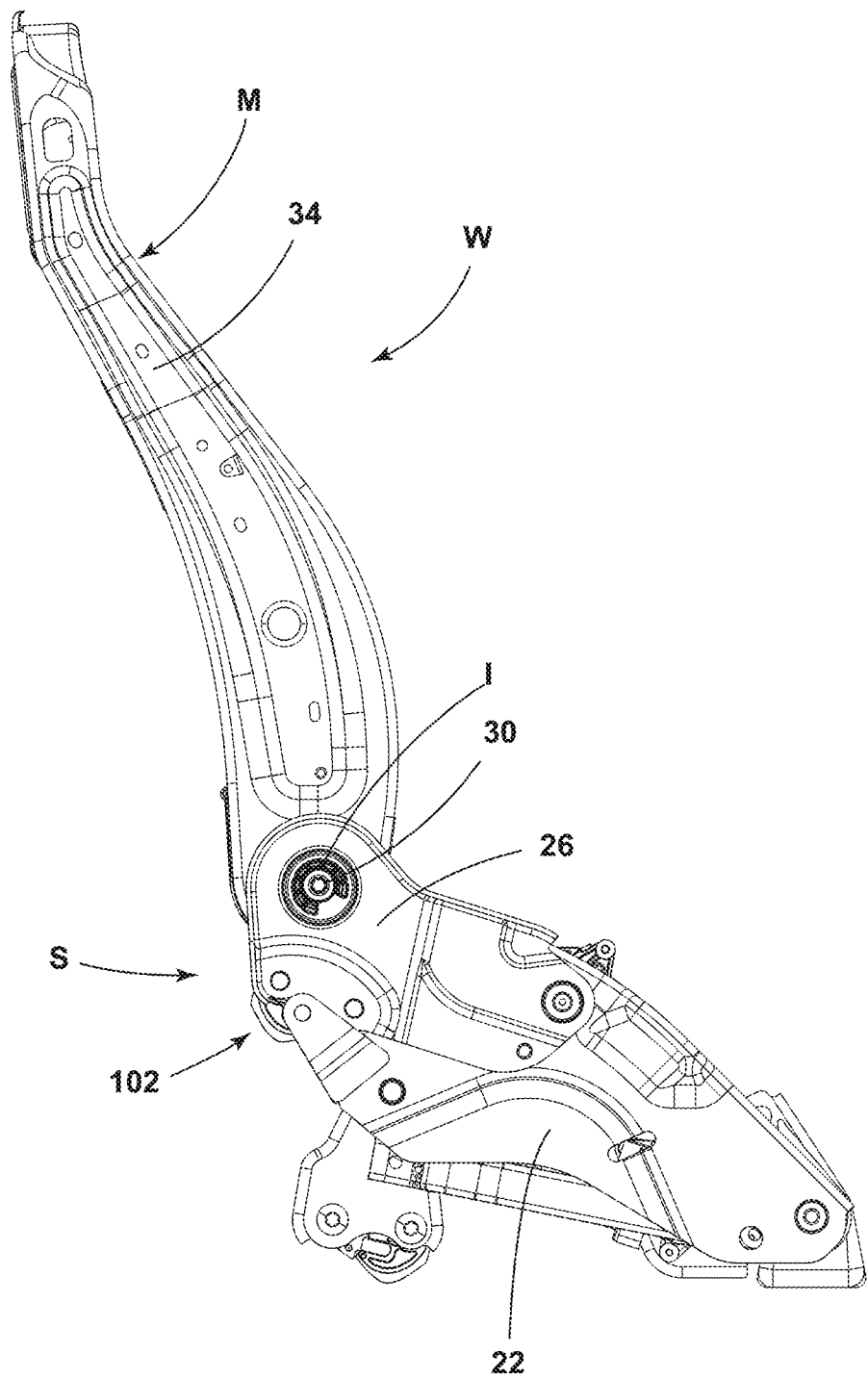
FIG. 3 is a right side elevational view of a seating assembly with the seatback disposed in a substantially upright position, the bracket disposed in a first position, and the pivotable seatback coupling disposed in a primary position.
Figure 4:
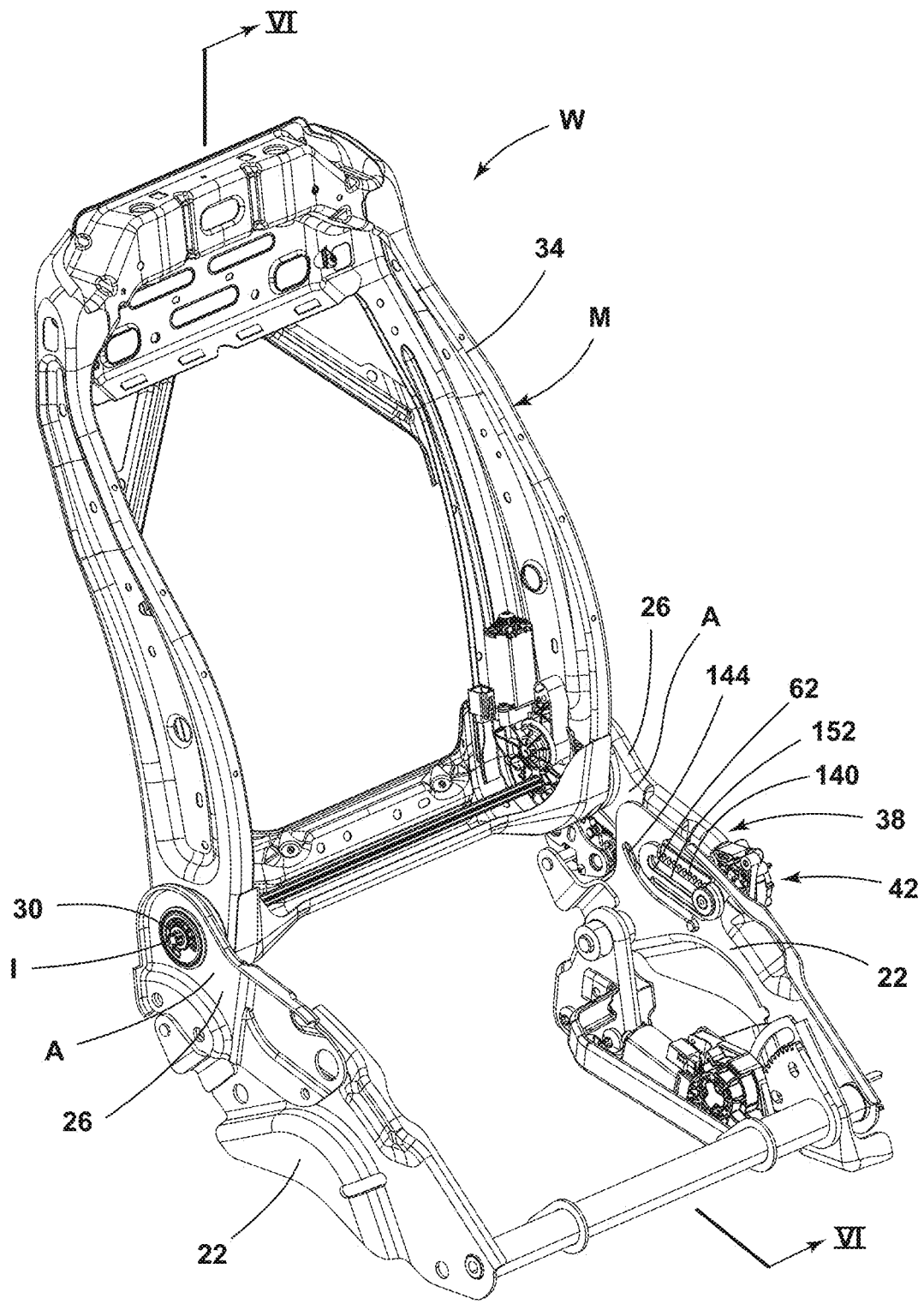
FIG. 4 is a right side front perspective view of the seating assembly of FIG. 3.
Figure 5:
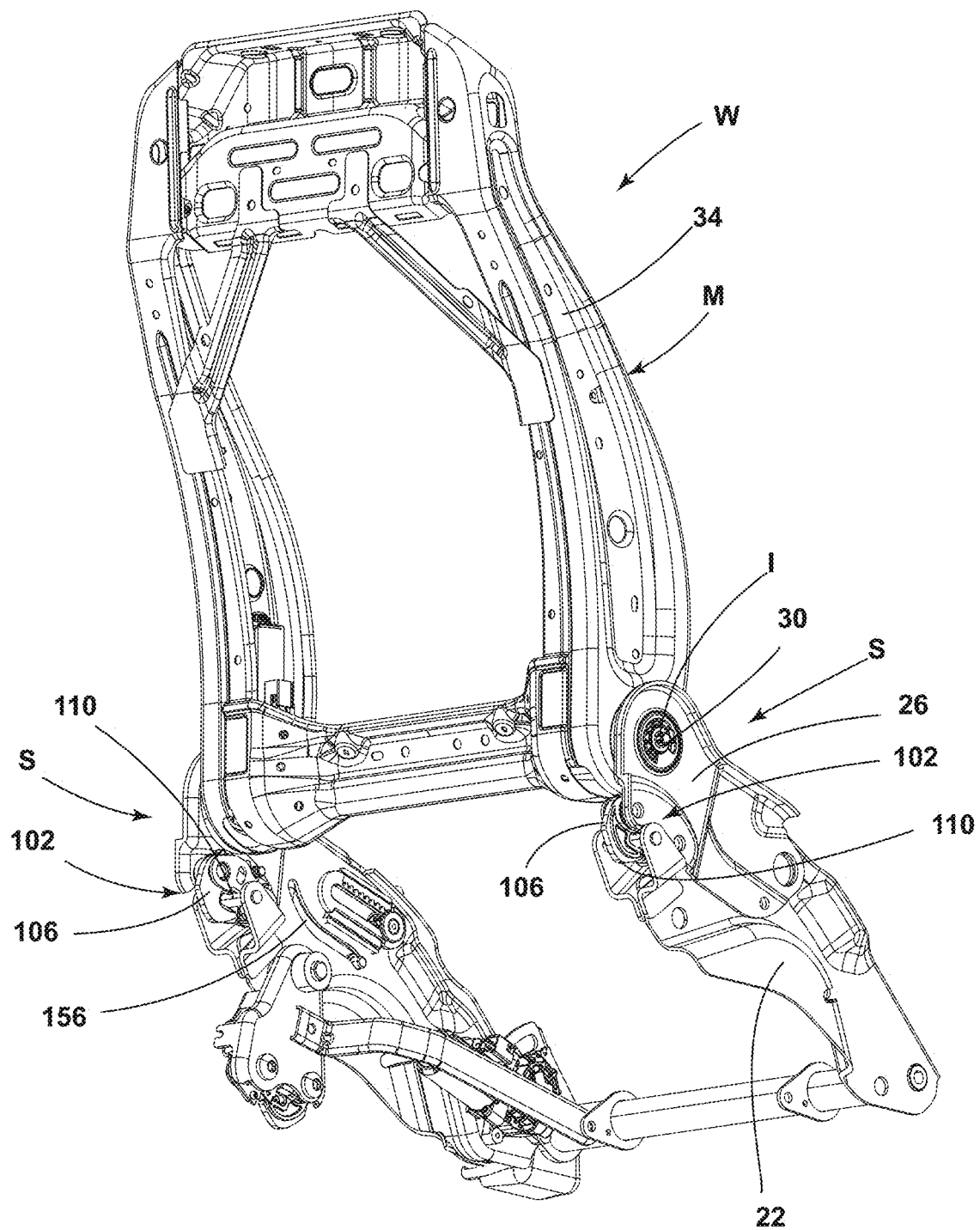
FIG. 5 is a right side back perspective view of the seating assembly of FIG. 3.
Figure 6:
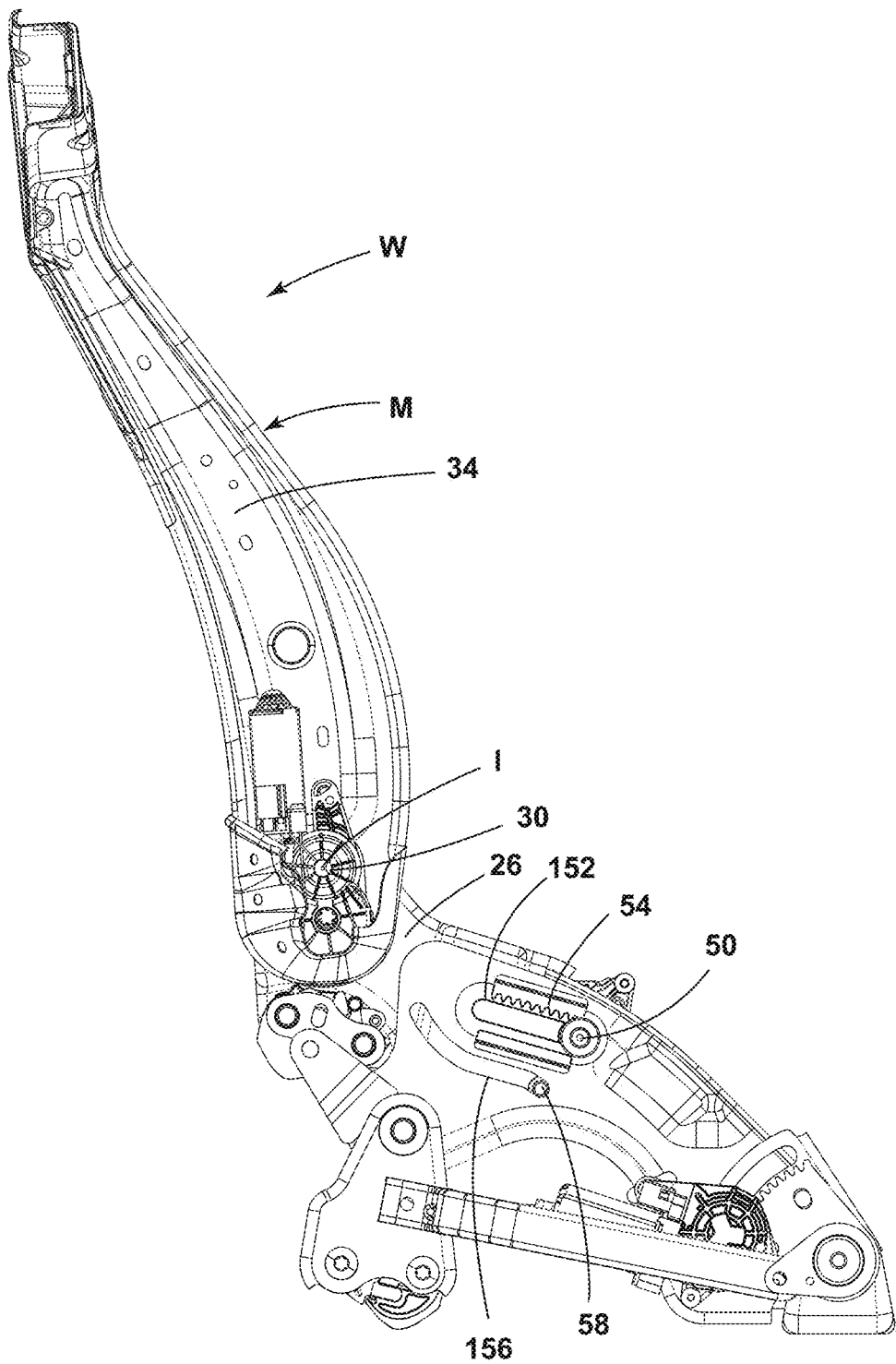
FIG. 6 is a cross-sectional view of a left side of the seating assembly taken along line VI-VI of FIG. 4.
Figure 21:
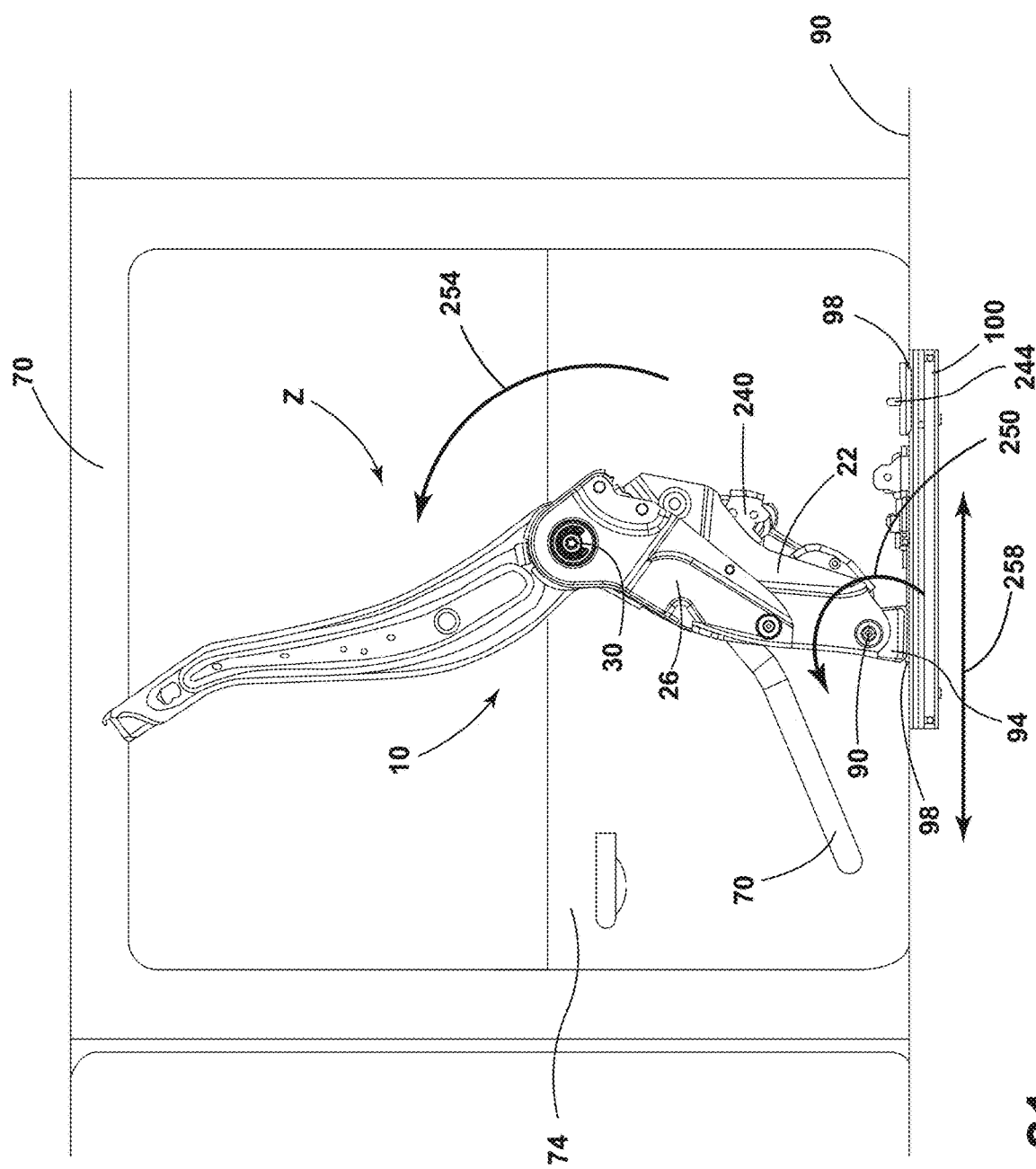
FIG. 21 is a left side elevational view of the seating assembly disposed on a track assembly in the standing position.
Figure 23:
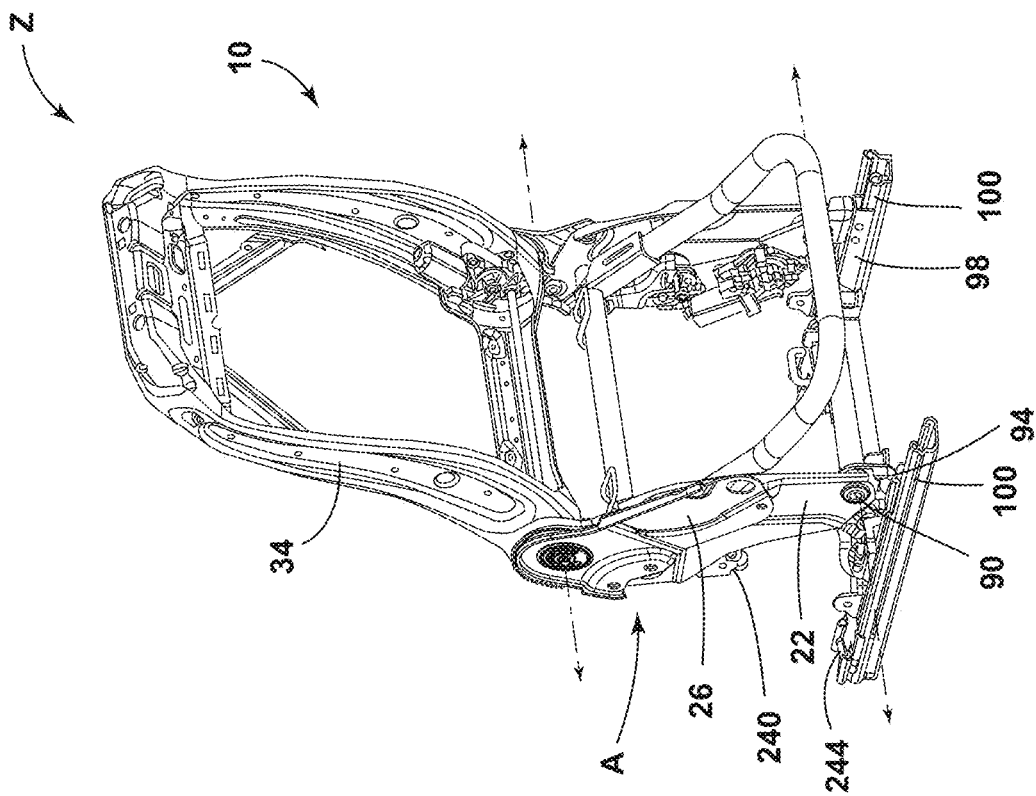
FIG. 23 is a right side perspective view of the seating assembly disposed on a track assembly in the standing position.

Referring to FIGS. 2A-2C, the seating assembly 10 is shown with the seatback 18 in various positions. In FIG. 2A, the seating assembly 10 includes the seatback 18 disposed in a substantially upright position M, the displaceable bracket 26 disposed in a first position A, and the pivotable seatback coupling 30 disposed in a primary position I. A lock mechanism 102 is shown in the engaged position S. In FIG. 2B, the seating assembly 10 includes the seatback 18 disposed in a forward inclined position O, the displaceable bracket 26 disposed in a second position B, and the pivotable seatback coupling 30 disposed in a secondary position J. The lock mechanism 102 is shown in the disengaged position T. The lock mechanism 102 may include a first portion disposed on the displaceable bracket 26 and a second portion disposed on the side bracket 22. In the example shown, the first portion includes a latch 106 coupled to the displaceable bracket 26, and the second portion includes a striker 110 coupled to the side bracket 22. In FIG. 2C, the seating assembly 10 includes the seatback 18 disposed in a substantially flat position P, the displaceable bracket 26 disposed in a second position B, and the pivotable seatback coupling 30 disposed in a secondary position J. As such, a passenger may reconfigure the seating assembly 10 from a sitting position W (FIG. 2A) to a seatback pitching position X (FIG. 2B) to a substantially fold flat position Y (FIG. 2C). Additionally, a passenger may configure the seating assembly 10 in at least the standing position Z (FIGS. 21 and 23).

With continued reference to FIGS. 2A-2C, adaptability of a seating assembly 10 to meet different passenger needs may contribute to a pleasant travel experience. Passengers may wish to reconfigure vehicle seating assemblies 10 to create additional space for cargo in a vehicle 70. By moving the pivotable seatback coupling 30 between the seatback 18 and the displaceable bracket 26 from a primary position I to a secondary position J, the seatback 18 may be positioned in a substantially flat position P over the seat 14 to create a substantially flat load floor 118. In this way, a passenger may reconfigure a seating assembly 10 to provide cargo storage space 122 atop the substantially flat load floor 118. A box 126 or other cargo may be stored on the seatback 18 in the substantially flat position P.

Passengers may also desire convenient vehicle 70 ingress and egress. A seating assembly 10 may be disposed adjacent to a vehicle door 74. (FIGS. 1, 21) The seating assembly 10 may be conveniently movable from a sitting position W to a standing position Z to allow a passenger space to access an adjacent row of seating. (FIGS. 20-23) The seating assembly 10 in the standing position Z may also be slidable along the track assembly 100 disposed in the vehicle floor 78 to increase the available entry or egress space between the adjacent row of seating and the vehicle door 74. (FIG. 21) As such, a reconfigurable seating assembly 10 may contribute to a pleasant travel experience by providing additional cargo storage space 122 on a substantially flat load floor 118 and adaptability for vehicle entry and egress.

With reference to the vehicle seating assembly 10 described below and shown in the attached figures, the vehicle seating assembly 10 may be described from the vantage point of a passenger sitting in the seating assembly 10. The side of a seating assembly 10 disposed on a right side of a seated passenger may be referred to as a right side of the seating assembly 10. The side of the seating assembly 10 disposed on the left side of a seated passenger may be referred to as the left side of the seating assembly 10.

Referring now to FIGS. 3-7, the seating assembly 10 in the sitting position W is shown. In FIGS. 3-7, the displaceable bracket 26 is in the first position A, and the pivotable seatback coupling 30 is in the primary position I. The lock mechanism 102 is in the engaged position S. The movement assembly 38 may include a driving member 140 and a guide member 144. The driving member 140 may include a gear assembly 42 that may move along a slot 152 in the side bracket 22 to move the displaceable bracket 26 between a first position A and a second position B. The driving member 140 may include a rack gear 54 disposed along the side bracket 22 and a pinion gear 50 extending from the displaceable bracket 26 and moveable along the rack gear 54. The guide member 144 may include a channel 62 in the side bracket 22. In the example shown, the channel 62 may include a cutaway portion 148 that may extend through the side bracket 22. It is contemplated that, in other examples, the channel 62 may include other configurations such as a depression in the side bracket 22. A pin 58 may protrude from the displaceable bracket 26 and may extend into the channel 62. A curvature 156 of the channel 62 may be designed to have a particular shape. The curvature 156 of the channel 62 may define the path of the pivotable seatback coupling 30 between the primary position I and the secondary position J. The curvature 156 of the channel 62 may include three segments 160, 164, 168. Segment 160 may be angled upward. Segment 164 may extend from segment 160 and may be substantially linear. Segment 168 may extend from the segment 164, and segment 168 may be curved upward.

Figure 7:
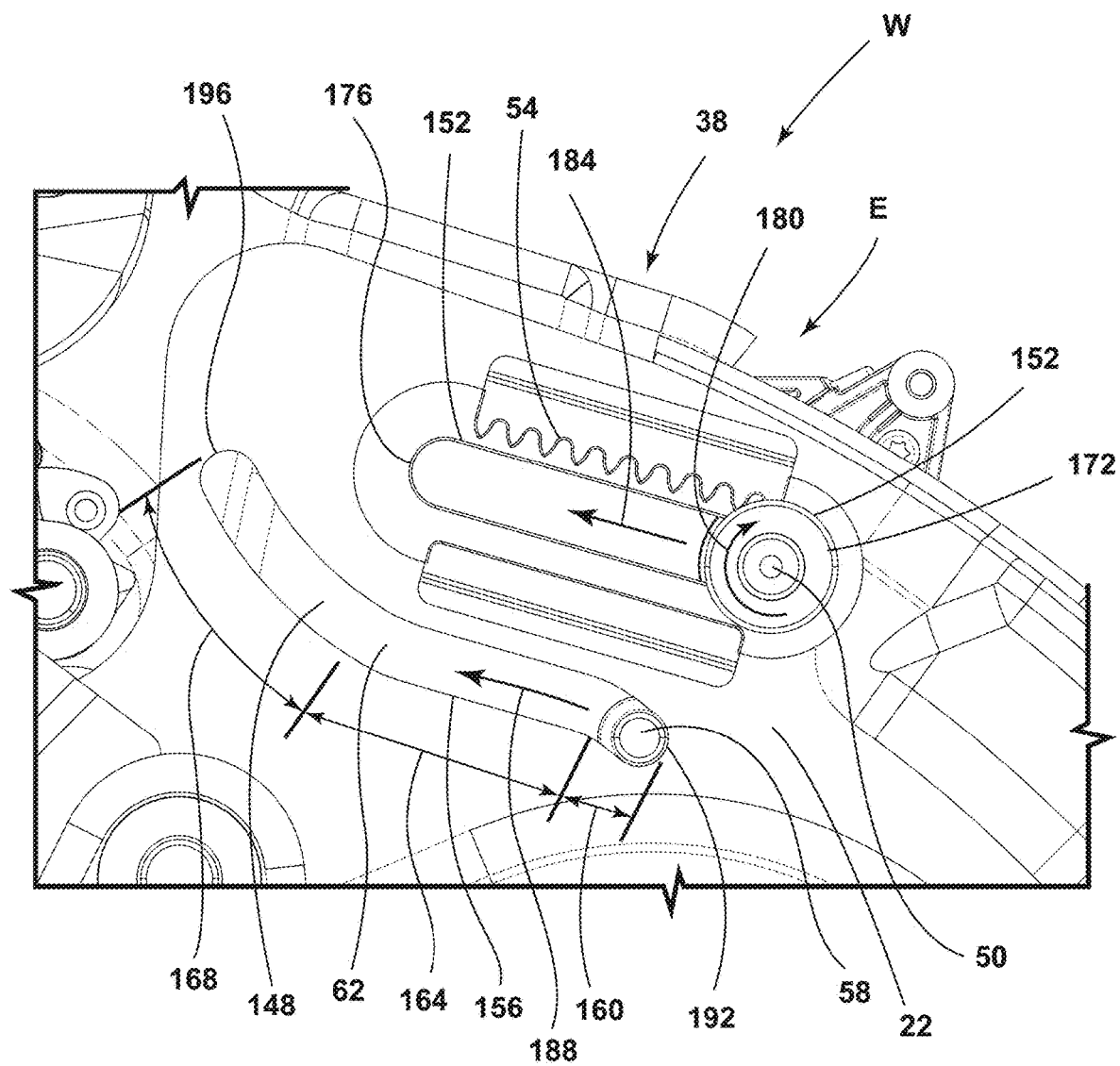
FIG. 7 is an elevational view of the left side bracket including the displacement member and the guide member, wherein, when the seatback is disposed in the substantially upright position, the bracket is disposed in the first position, and the pivotable seatback coupling is disposed in the primary position.
Figure 8:
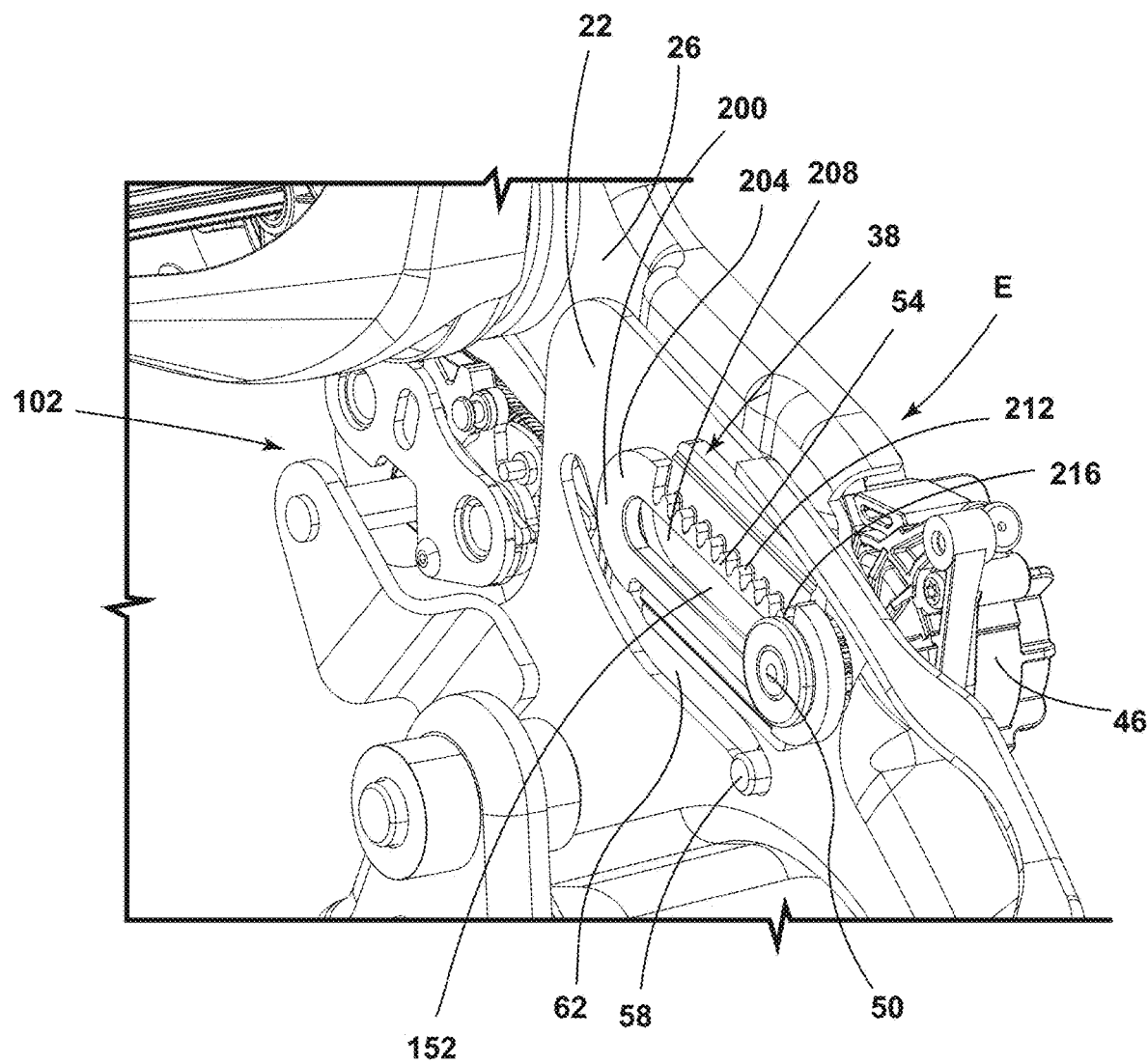
FIG. 8 is a right side front perspective view of the left side bracket including a movement assembly and a latch.
Figure 9:
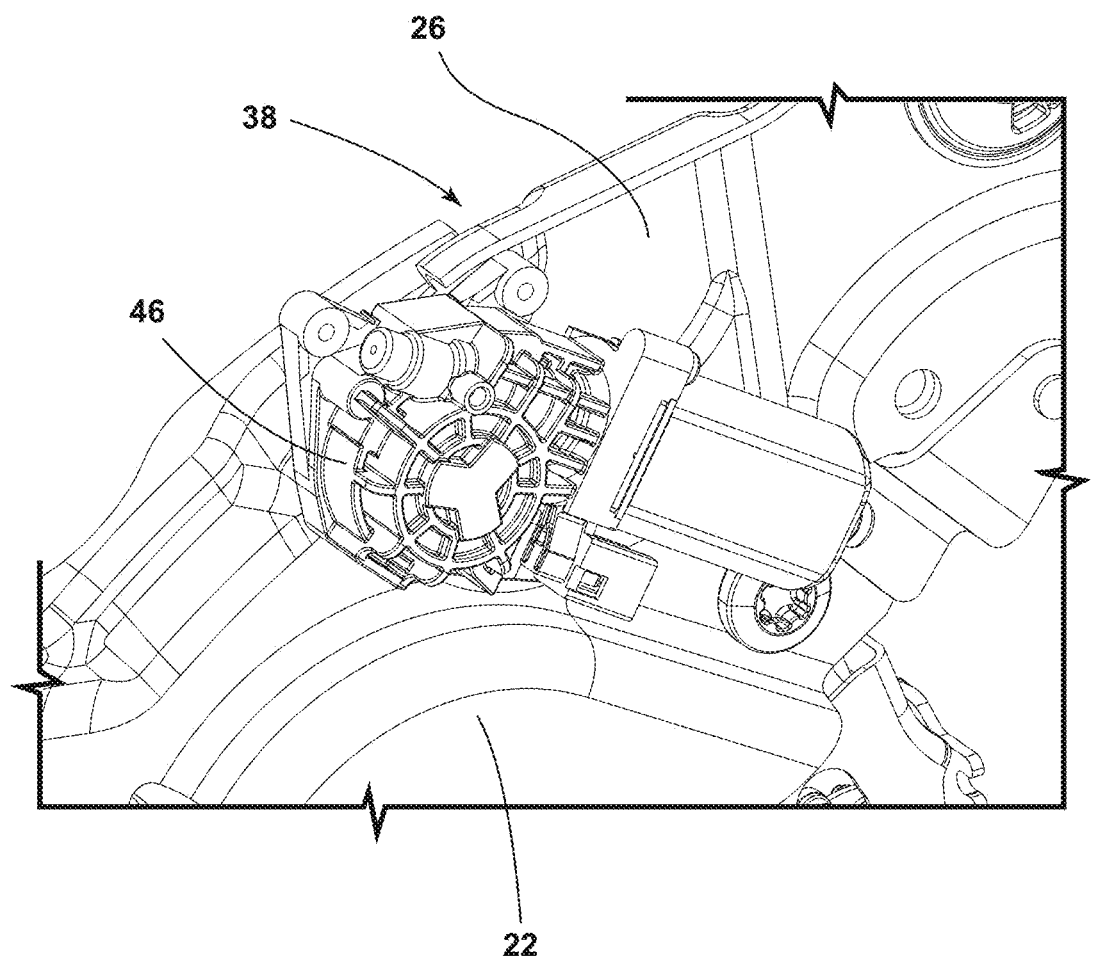
FIG. 9 is a left side back perspective view of a portion of the movement assembly.
Figure 10:
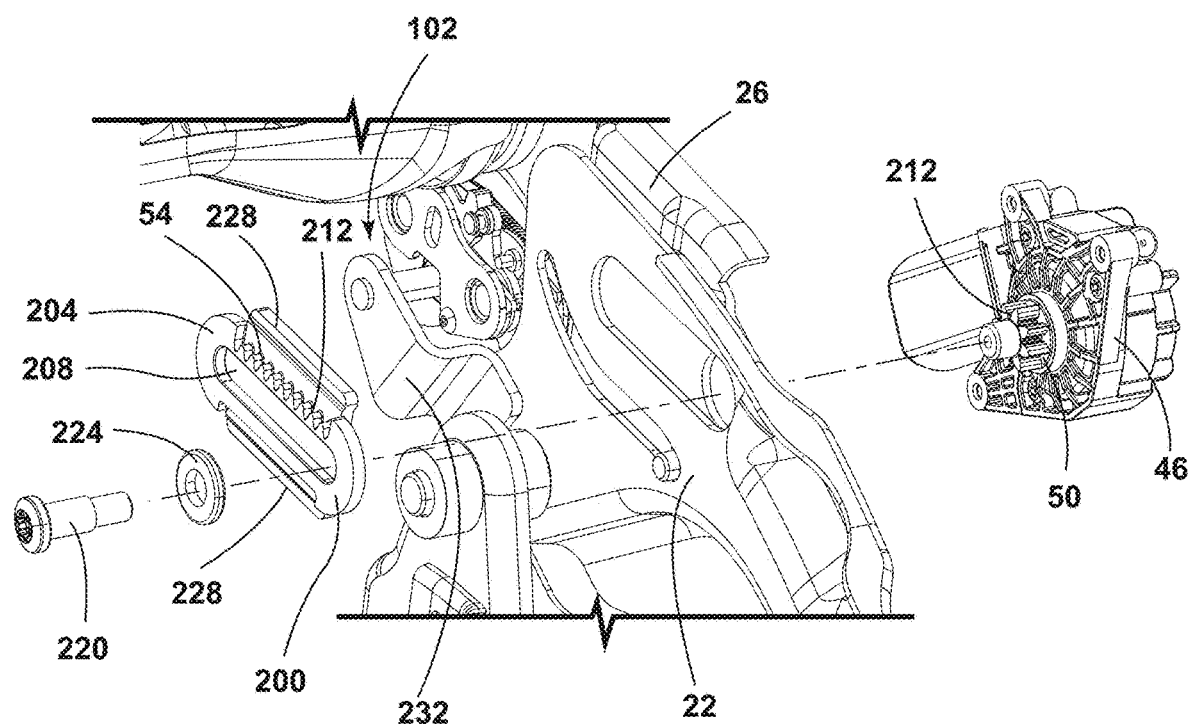
FIG. 10 is an exploded right side front perspective view of the left side bracket including a movement assembly.
Figure 11:
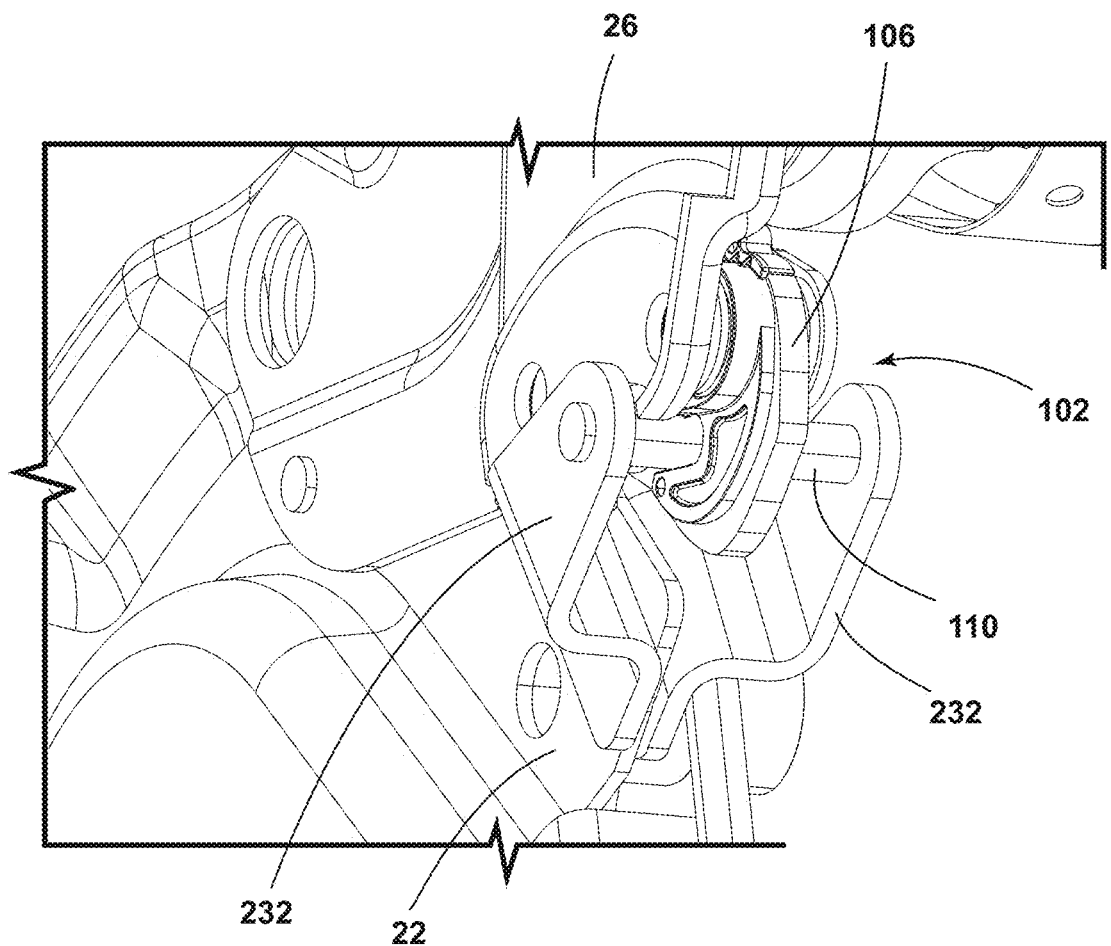
FIG. 11 is a rear perspective view of the lock mechanism.
Figure 12:
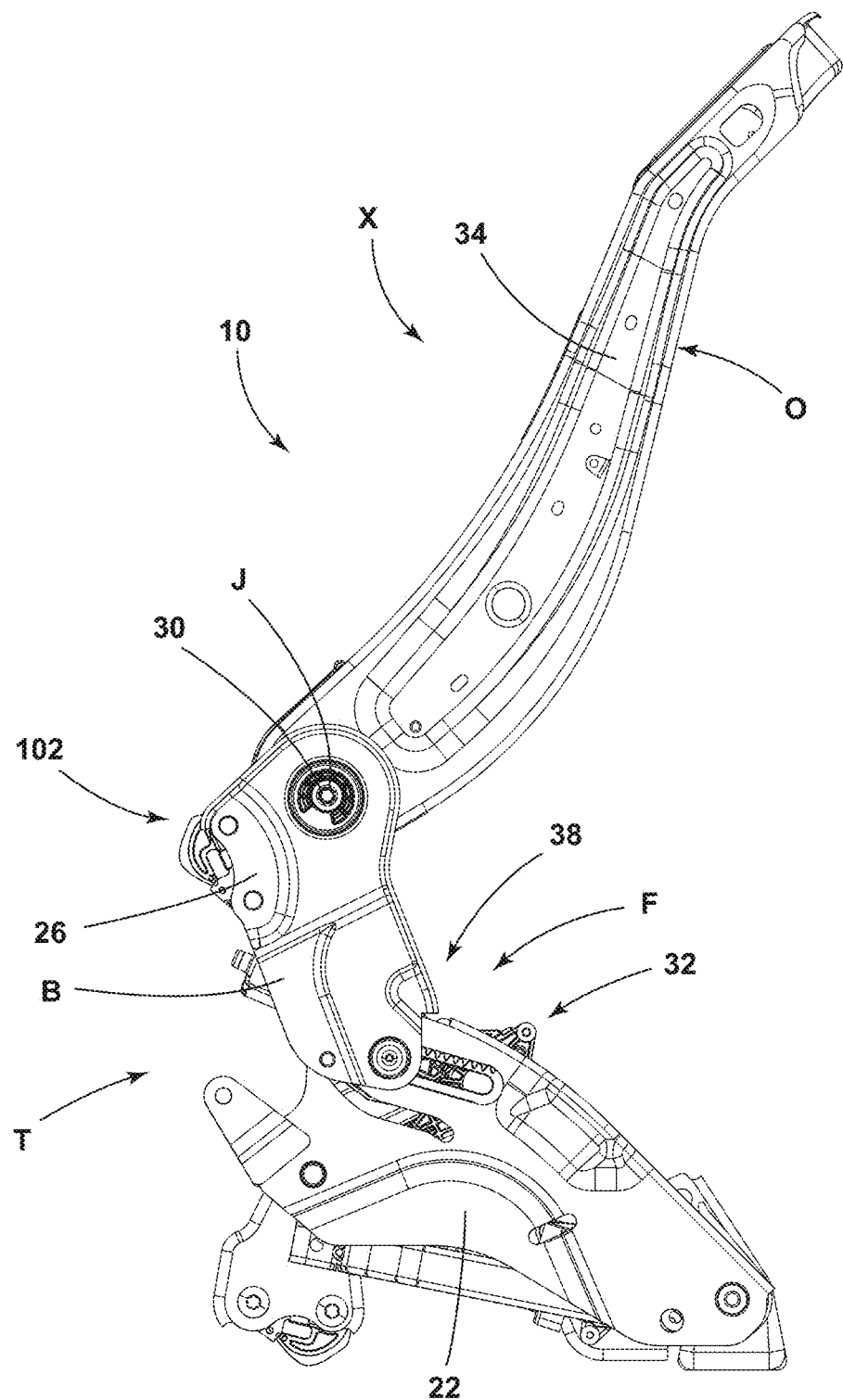
FIG. 12 is a right side elevational view of a seating assembly with the seatback disposed in a forward inclined position, the bracket disposed in a second position, and the pivotable seatback coupling disposed in a secondary position.
Figure 13:
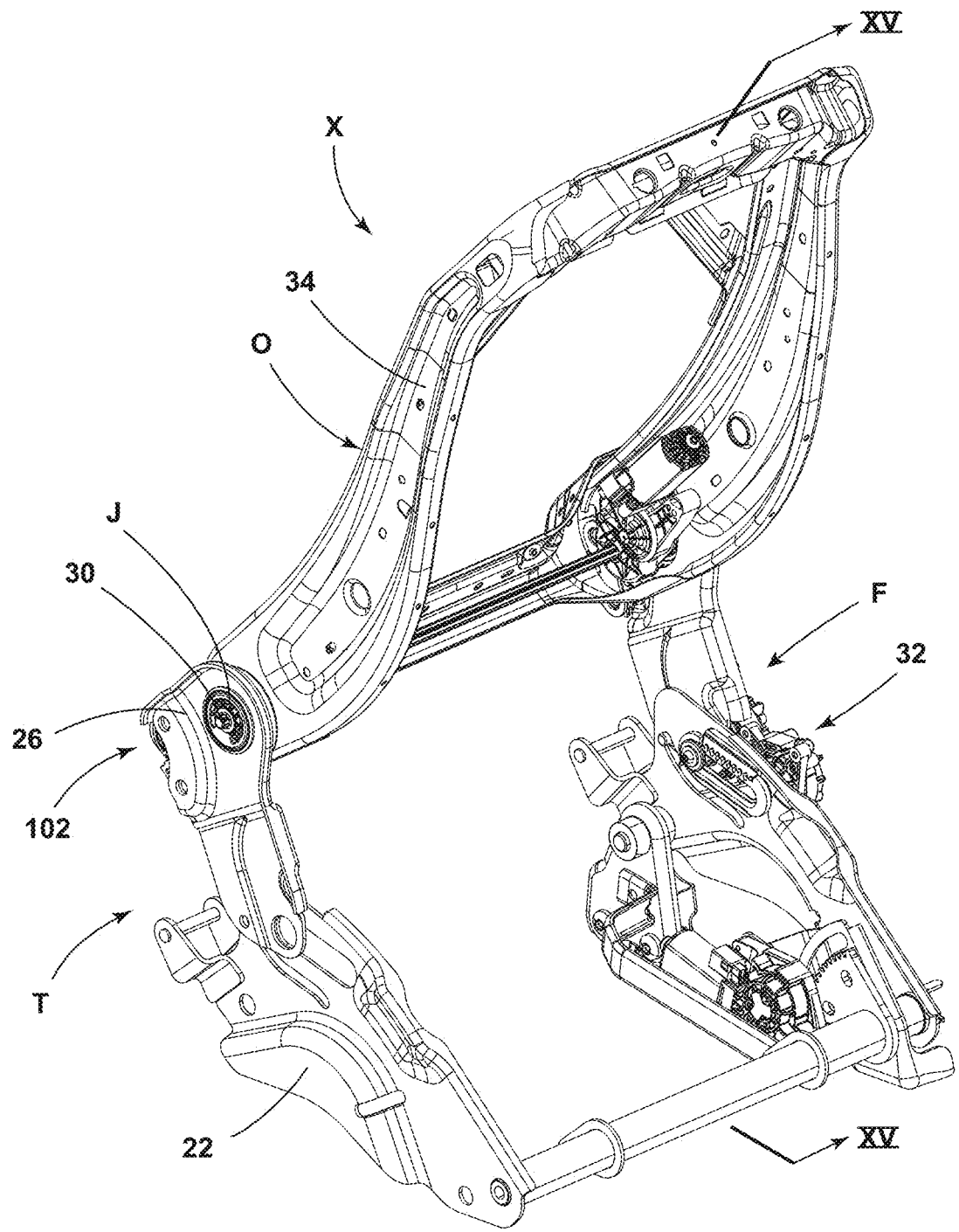
FIG. 13 is a right side front perspective view of the seating assembly of FIG. 6.
Figure 14:
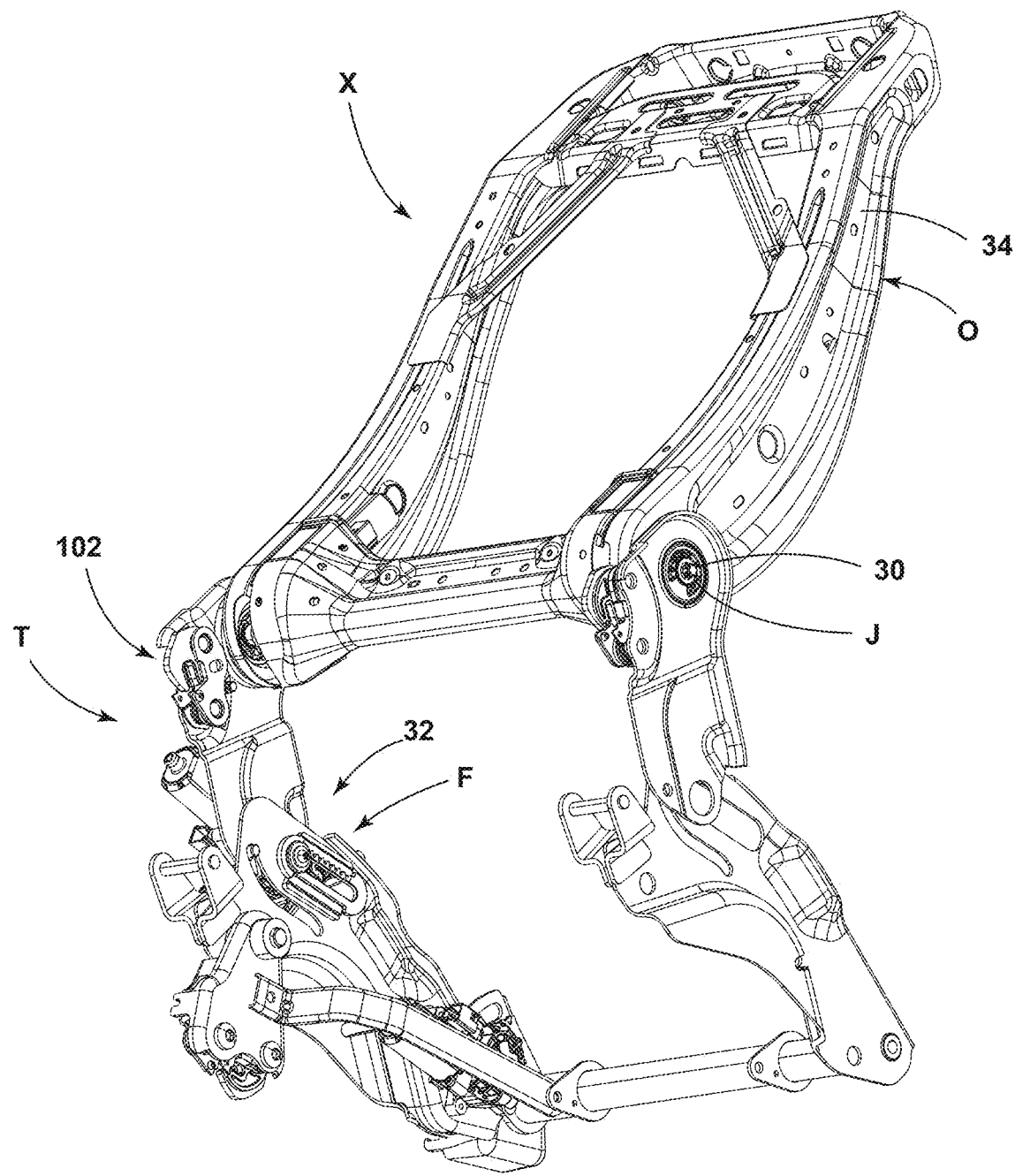
FIG. 14 is a right side back perspective view of the seating assembly of FIG. 6.
Figure 15:
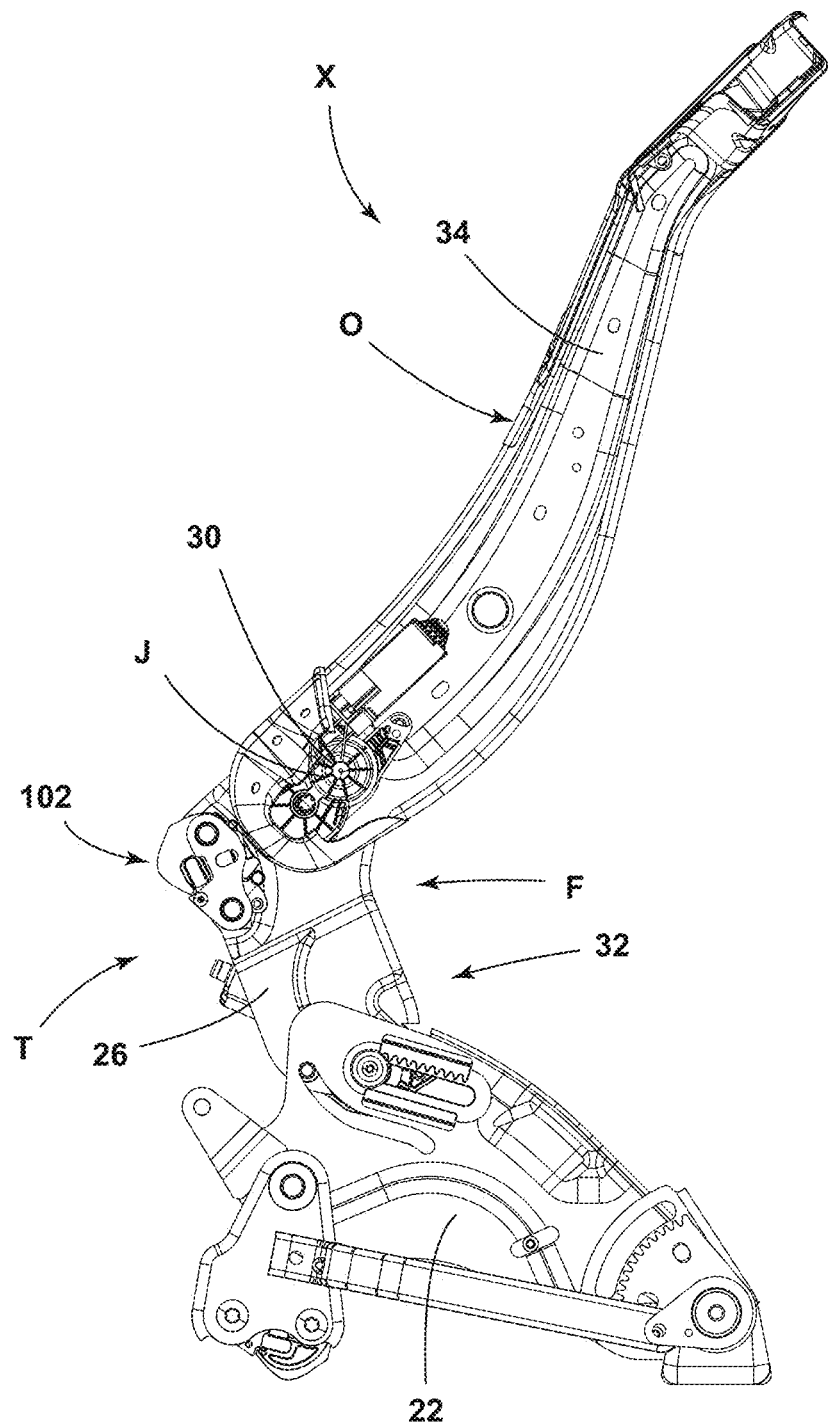
FIG. 15 is a cross-sectional view of a left side of the seating assembly taken along line XV-XV of FIG. 13 with the seatback disposed in a forward inclined position, the bracket disposed in the second position, and the pivotable seatback coupling disposed in the secondary position.

With continuing reference to FIGS. 3-7, the movement assembly 38 is shown in a design position E of the movement assembly 38. The slot 152 may include an end 172 and an end 176. In the design position E of the movement assembly 38, the pinion gear 50 may be disposed at an end of the slot 152. In the design position E of the movement assembly 38, the pin 58 may be disposed at an end 192 of the channel 62. As the pinion gear 50 rotates along the rack gear 54, the displaceable bracket 26 moves between the first position A and the second position B in the direction shown by arrow 184. As the pinion gear 50 rotates in the direction shown by arrow 180, the pinion gear 50 may travel along the rack gear 54 in the side bracket 22 in the direction shown by arrow 184 (FIG. 7). In response to the travel of the pinion gear 50 along the rack gear 54 in the side bracket 22, the pin 58 may move along the channel 62 in the side bracket 22 in the direction shown by arrow 188. The channel 62 may have an end 192 and an end 196. In the design position E of the movement assembly 38, the pin 58 may be disposed in end 192 of the channel 62.

With continued reference to FIGS. 3-7, it is to be understood that the movement assembly 38 is shown disposed on the left side of the seating assembly 10. In various examples, the movement assembly 38 may be disposed on the right side of the seating assembly 10. When the movement assembly 38 is disposed on the side bracket 22 on one side (e.g., the right side or the left side) of the seating assembly 10, then a slot 152 and a channel 62 may be disposed on a side bracket 22 on the opposing side of the seating assembly 10 to allow the displaceable bracket 26 disposed on the opposing side of the seating assembly 10 to move between the first position A and the second position B in response to the actuation of the gear assembly 42. In some examples, a movement assembly 38 may be disposed on the right side and the left side of the seating assembly 10.

With continued reference to FIGS. 3-7, the lock mechanism 102 in the engaged position S is shown. The lock mechanism 102 may include a first portion disposed on the displaceable bracket 26 and a second portion disposed on the side bracket 22. The lock mechanism 102 may be in an engaged position S when the displaceable bracket 26 is in the first position A. The first portion of the lock mechanism 102 may include a latch 106. The second portion of the lock mechanism 102 may include a striker 110. The latch 106 may be engaged with the striker 110 to secure the displaceable bracket 26 to the seat frame 82 when the displaceable bracket 26 is in the first position A.

Referring to FIGS. 8-11, views of the movement assembly 38 and the lock mechanism 102 are shown. The pinion gear 50 is shown in the design position E in the slot 152. The pinion gear 50 may extend from a motor 46 or actuator that may be mounted to the displaceable bracket 26. The pinion gear 50 may extend through the slot 152 in the side bracket 22. An oblong member 200 may include a rack gear 54. An oblong member 200 including a rack gear 54 may be disposed over the slot 152 in the side bracket 22. The oblong member 200 may include a frame 204 and an aperture 208. The pinion gear 50 may extend through the oblong member 200 so that the teeth 212 of the pinion gear 50 may mesh with the teeth 212 of the oblong member 200 to form a toothed interface 216. A fastener 220 and a washer 224 may secure an end of the pinion gear 50 to the oblong member 200, the side bracket 22, and the displaceable bracket 26. The oblong member 200 may include one or more flanges 228. In the example shown, opposing flanges 228 are shown disposed on the oblong member 200. A portion of the oblong member 200 may be disposed in the slot 152 of the side bracket 22. The oblong member 200 and the slot 152 may form an interference fit. The fastener 220 attached to the pinon gear 50 may secure the oblong member 200 to the side bracket 22. As such, it is contemplated that various gear assemblies could be disposed in the slot 152 of the side bracket 22. For example, gear assemblies, including a rack gear 54 and a pinion gear 50, of different tooth sizes may be conveniently attached to the side bracket 22 and the displaceable bracket 26 using an oblong member 200 or other design and a pinion gear 50 extending from a motor attached to a displaceable bracket 26 or other design. Thus, design of the movement assembly 38, including the driving member 140, (for example, gear assembly 42 disposed in the slot 152) and the guide member 144 (for example, channel 62 and pin 58) may be customized. The design of the movement assembly 38 may dictate the path of the pivotable seatback coupling 30 between the primary position I and the secondary position J.

With continued reference to FIGS. 8-11, the lock mechanism 102 is shown. The lock mechanism 102 may include the latch 106 and the striker 110. The latch 106 may be mounted to the displaceable bracket 26. The striker 110 may be mounted to the side bracket 22. The striker 110 may extend between a pair of supports 232 that may be disposed on opposing sides of the side bracket 22. Each support 232 of the pair of supports 232 may have a stepped shape that may extend away from the side bracket 22.

Figure 16:
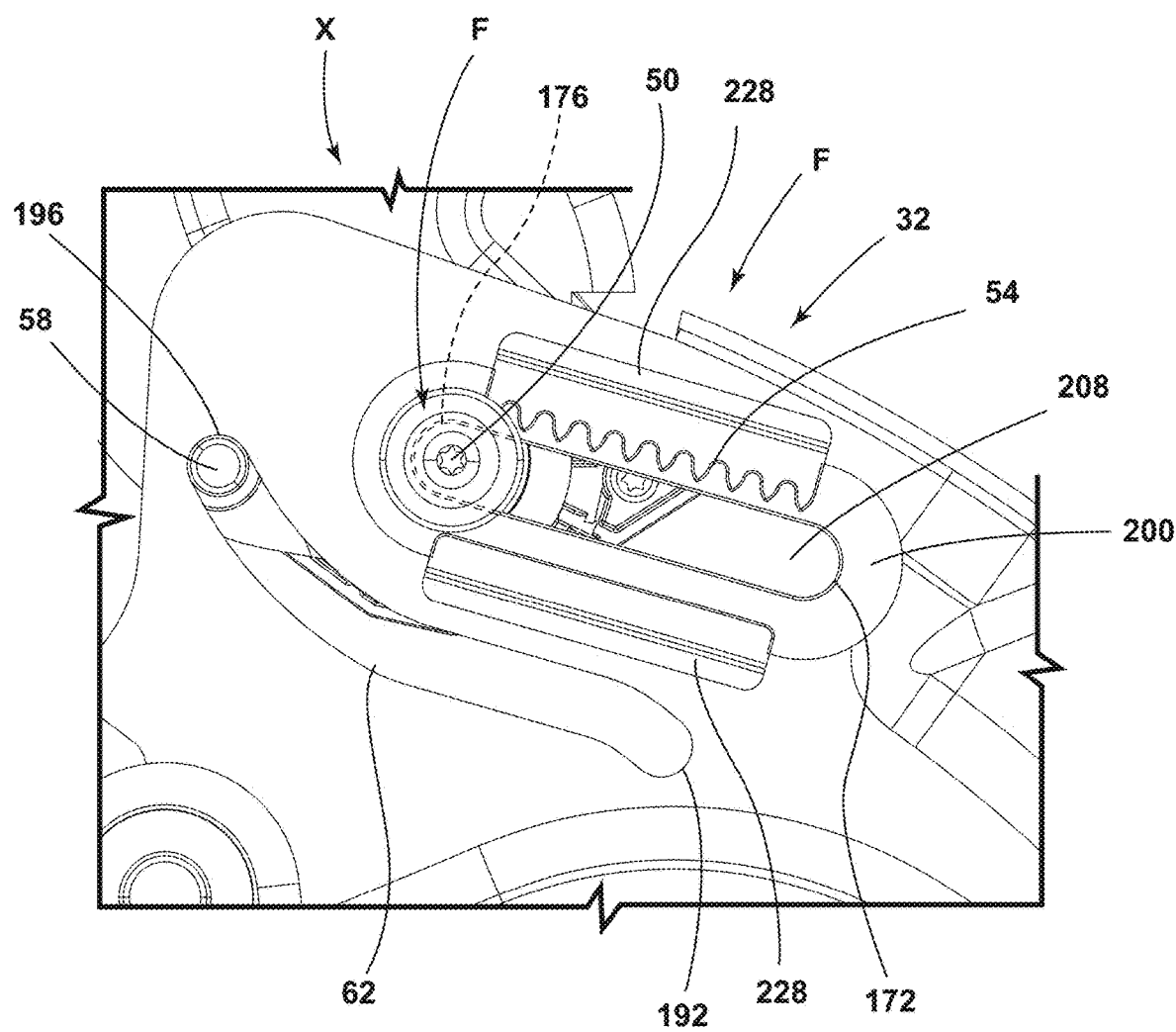
FIG. 16 is an elevational view of the left side bracket including the displacement member and the guide member, wherein, when the seatback is a forward inclined position, the bracket is disposed in the second position, and the pivotable seatback coupling is disposed in the secondary position.

Referring to FIGS. 12-16, the seating assembly 10 is shown in the seatback pitching position X. In the seatback pitching position X, the movement assembly 38 is in the fully deployed position F. The pivotable seatback coupling 30 is shown in the secondary position J. The displaceable bracket 26 is shown in the second position B. The seatback frame 34 is shown in a forward inclined position O. The lock mechanism 102 is shown in a disengaged position T. With reference to FIG. 16, the pinion gear 50 is shown at the end of the aperture 208 in the oblong member 200 when the movement assembly 38 is in the fully deployed position F. The pin 58 is shown at the end of the channel 62 when the movement assembly 38 is in the fully deployed position F. As such, the movement assembly 38 may allow a passenger to actuate a motor 46 to adjust the position of the pivotable seatback coupling 30 so that the seatback 18 may be disposed over the seat 14 to create a substantially flat load floor 118.

Figure 17:
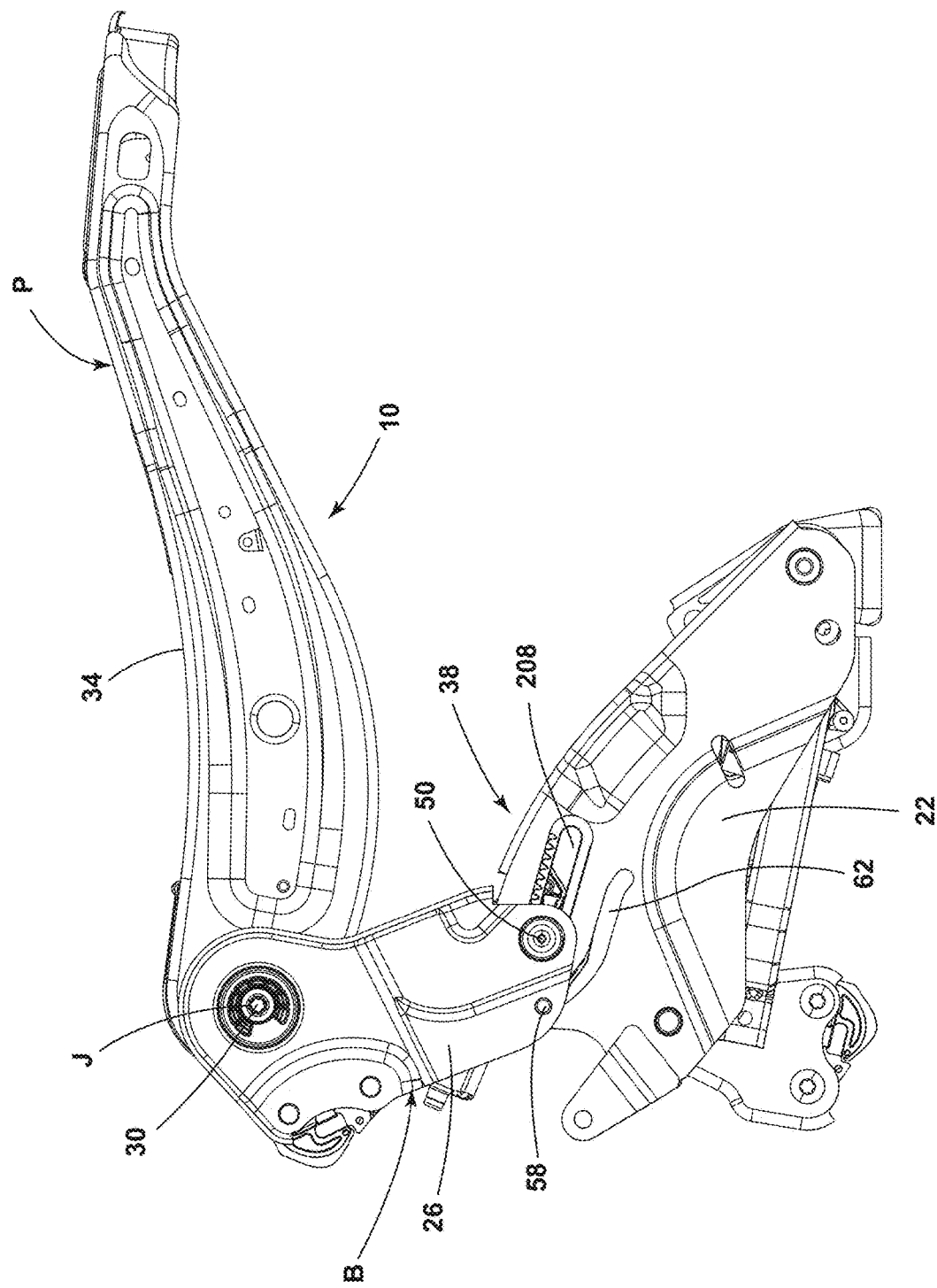
FIG. 17 is a right side elevational view of a seating assembly with the seatback disposed in a substantially flat position, the bracket disposed in the second position, and the pivotable seatback coupling disposed in the secondary position.
Figure 18:
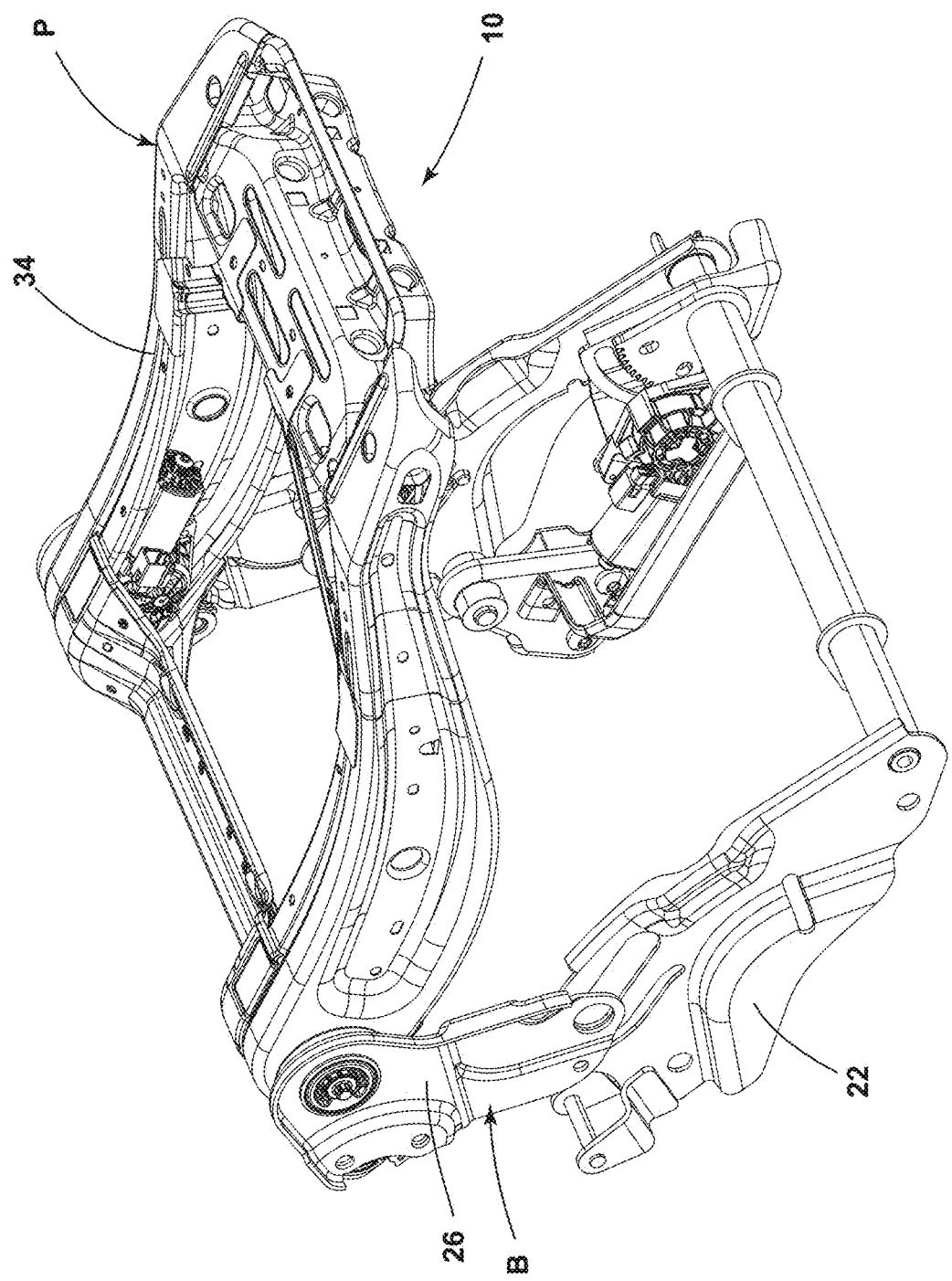
FIG. 18 is a right side front perspective view of the seating assembly of FIG. 17.
Figure 19:
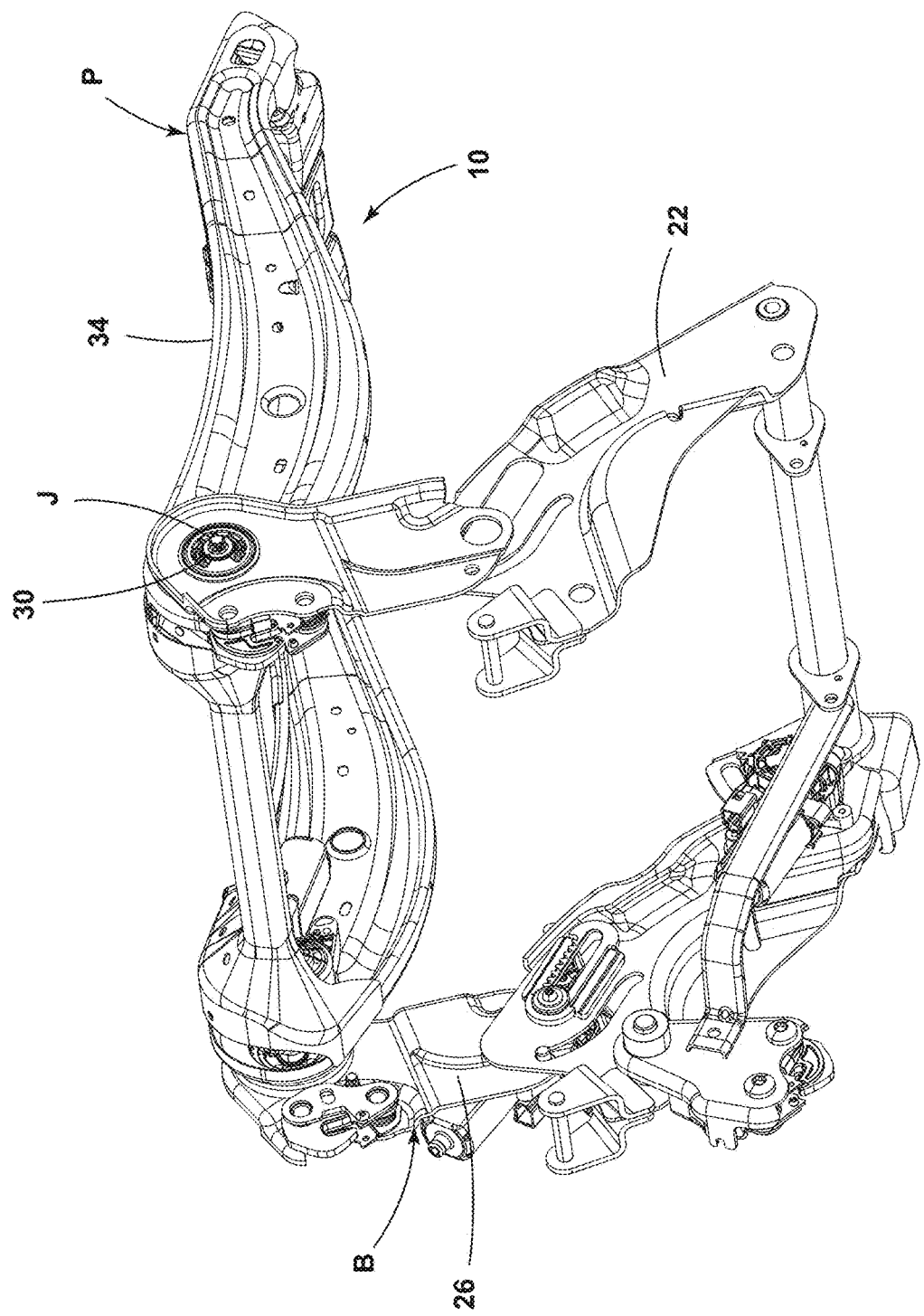
FIG. 19 is a right side back perspective view of the seating assembly of FIG. 17.

Referring now to FIGS. 17-19, the seating assembly 10 is shown with the seatback frame 34 in the substantially fold flat position Y. The seatback 18 has been rotated about the pivotable seatback coupling 30 from the forward inclined position O to the substantially flat position P. In the substantially flat position P, the seatback 18 may include a substantially flat load floor 118 disposed on the seatback 18. As shown in FIG. 2C, the substantially flat load floor 118 may provide a cargo storage space 122 for large items such as box 126.

Figure 20:
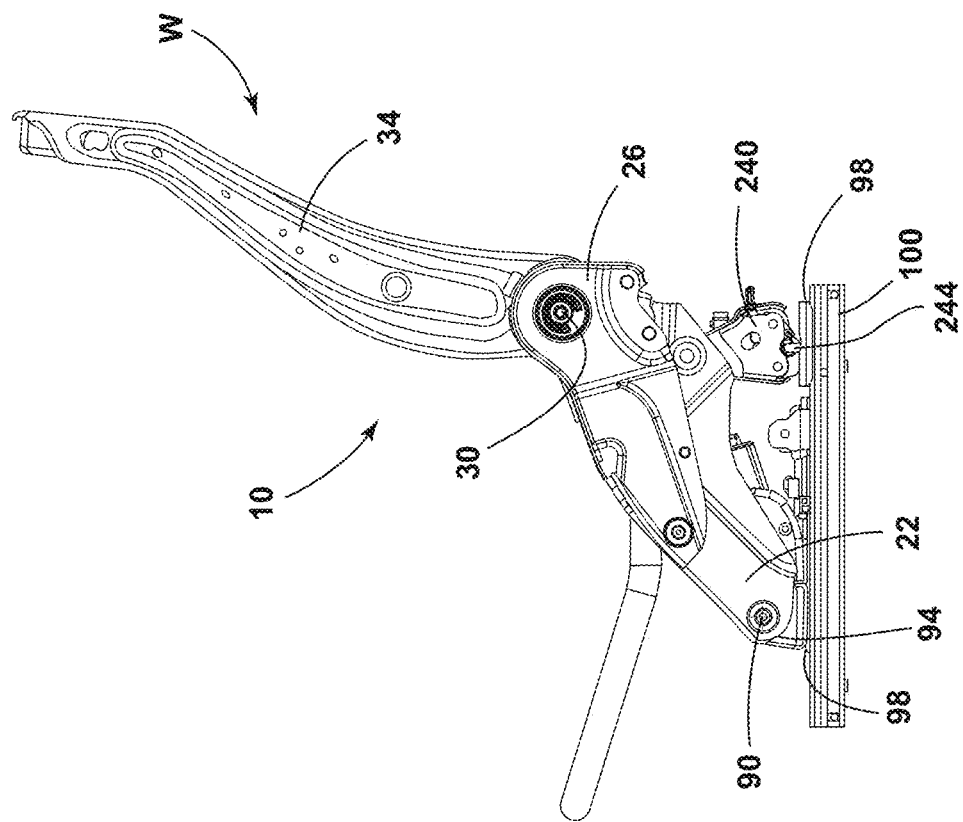
FIG. 20 is a left side elevational view of the seating assembly disposed on a track assembly in the sitting position.

Referring now to FIGS. 20-23, the seating assembly 10 is shown in the sitting position W and the standing position Z. Referring to FIG. 20, the seating assembly 10 is shown in the sitting position W and disposed on the track assembly 100. Each of the side brackets 22 may include a pivotable base coupling 90 for rotatably coupling each of the side brackets 22 to mounting brackets 94 fixedly coupled to the rails 98. The latches 240 may secure the seating assembly 10 to a striker 244 coupled to the rails 98. As such, it is contemplated that the latches 240 may be released to rotate the seating assembly 10 from a sitting position W (FIG. 20) to a standing position Z (FIG. 21) about the pivotable base coupling 90 and in the direction shown by arrow 250. Arrow 250 shows the rotation of the seating assembly 10 around the pivotable base coupling 90 as the seating assembly 10 moves from the sitting position W to the standing position Z. Arrow 258 shows the direction of travel of the seating assembly 10 along the track assembly 100 as the seating assembly 10 moves fore and aft within the vehicle 70 to create a larger space for passenger ingress and egress into a space behind the seating assembly 10. As such, the seating assembly 10 may be moved from the sitting position W to the standing position Z to allow convenient passenger or cargo ingress and egress into a space behind the seating assembly 10.

With continued reference to FIG. 21, the pivotable seatback coupling 30 may move in the direction shown by arrow 254 as the seating assembly 10 moves from the sitting position W to the standing position Z. The latches 240 may tuck under the side bracket 22 of the seating assembly 10 as the seating assembly 10 moves from the sitting position W to the standing position Z.

Figure 22:
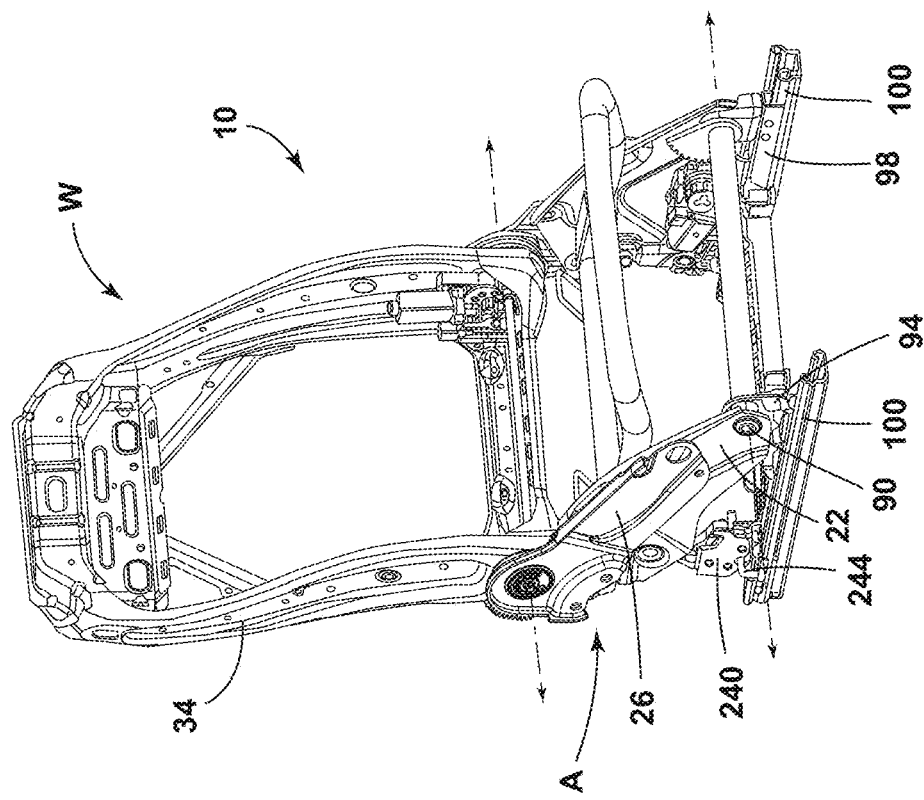
FIG. 22 is a front right side perspective view of the seating assembly disposed on a track assembly in the sitting position.

Referring now to FIG. 22, the seating assembly 10 is shown in the sitting position W. Referring now to FIG. 23, the seating assembly 10 is shown in the standing position Z.

A variety of advantages may be obtained by use of the present disclosure. A passenger may reconfigure the seating assembly 10 to meet various passenger needs. The pivotable seatback coupling 30 in a primary position I may allow a passenger to recline the seatback 18 from a substantially upright position M to a rearward reclined position N for sleeping or resting. The vehicle seating assembly 10 with the pivotable seatback coupling 30 in a secondary position J may allow the seatback 18 to rotate between a forward inclined position O to a substantially flat position P to create a substantially flat load floor 118 for storing cargo. The seating assembly 10 may be moved between a sitting position W and a standing position Z to allow passenger egress and ingress to and from a space behind the vehicle seating assembly 10.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

It is also important to note that the construction and arrangement of the elements of the disclosure, as shown in the exemplary embodiments, are illustrative. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a seat including:
     a side bracket;
   a seatback;
   a displaceable bracket extending between the seatback and the side bracket;
   a pivotable seatback coupling between the displaceable bracket and the seatback; and
   a movement assembly operably coupling the displaceable bracket to the side bracket, wherein the movement assembly is positionable between a design position and a fully deployed position to move the displaceable bracket between a first position and a second position, respectively, and to move the pivotable seatback coupling between a primary position and a secondary position, respectively, wherein, when the pivotable seatback coupling is in a secondary position, the seatback is movable between a forward inclined position and a substantially flat position, wherein the movement assembly includes a drive member and a guide member, and wherein the drive member includes a rack tear disposed along the side bracket and a pinion gear extending from the displaceable bracket and movable along the rack gear.

2. The vehicle seating assembly of claim 1, wherein the guide member includes a channel in the side bracket.

3. The vehicle seating assembly of claim 2, wherein the displaceable bracket includes a pin protruding from the displaceable bracket and extending into the channel.

4. The vehicle seating assembly of claim 3, wherein the channel includes a cutaway portion extending through the side bracket.

5. The vehicle seating assembly of claim 4, wherein the rack gear is disposed on an oblong member positionable against a slot in the side bracket.

6. The vehicle seating assembly of claim 5, wherein the oblong member includes one or more mounting areas for mounting the oblong member to the slot.

7. The vehicle seating assembly of claim 6, wherein the channel includes a curvature having three segments, wherein the first segment is angled upward, the second segment extends from the first segment and is linear, and a third segment extends from the second segment and is angled upward.

8. The vehicle seating assembly of claim 7, wherein the curvature of the channel defines a path of the pivotable seatback coupling between the primary position and the secondary position.

9. A vehicle seating assembly, comprising:
   a seat including:
     a side bracket;
   a seatback;
   a displaceable bracket extending between the seatback and the side bracket;

a pivotable seatback coupling between the displaceable bracket and the seatback; and a movement assembly operably coupling the displaceable bracket to the side bracket, wherein the movement assembly is positionable between a design position and a fully deployed position to move the displaceable bracket between a first position and a second position, respectively, and to move the pivotable seatback coupling between a primary position and a secondary position, respectively, wherein, when the pivotable seatback coupling is in a secondary position, the seatback is movable between a forward inclined position and a substantially flat position; and a lock mechanism including:
  a first portion disposed on the displaceable bracket; and
  a second portion disposed on the side bracket, wherein the lock mechanism is in an engaged position when the displaceable bracket is in the first position.

10. The vehicle seating assembly of claim 9, wherein the first portion of the lock mechanism includes a latch, and wherein the second portion of the lock mechanism includes a striker.

11. A vehicle seating assembly, comprising:
  a seat frame including:
    a side bracket;
  a seatback; and
  a displaceable bracket operably coupled to the seatback with a pivotable seatback coupling and operably coupled to the side bracket with a movement assembly for adjusting the position of the displaceable bracket between a first position and a second position, thereby adjusting the pivotable seatback coupling between a primary position and a secondary position, wherein, when the pivotable seatback coupling is in the secondary position, the seatback is movable between a forward inclined position and a substantially flat position, and wherein the movement assembly includes a gear assembly that moves the displaceable bracket along a slot in the side bracket.

12. The vehicle seating assembly of claim 11, wherein the movement assembly includes a channel disposed in the side bracket and a pin extending from the displaceable bracket and movable along the channel, and wherein the shape of the channel determines the path of the pivotable seatback coupling between the primary position and the secondary position.

13. The vehicle seating assembly of claim 12, further comprising:
  a lock mechanism disposed on the displaceable bracket and engageable with a striker disposed on the side bracket when the displaceable bracket is in the first position.

14. The vehicle seating assembly of claim 13, further comprising:
  a pivotable base coupling defined by a mounting bracket operably coupled to the side bracket, wherein the side bracket is rotatable around the pivotable base coupling to move the seating assembly between a sitting position and a standing position.

15. The vehicle seating assembly of claim 14, wherein the seating assembly in the standing position is slidable along a track assembly disposed in a vehicle floor.

16. A seating assembly comprising:
  a seat;
  a seatback; and
  a displaceable bracket disposed between the seat and the seatback configured to displace a seatback pivot between a primary position and a secondary position, and including:
    an elongated slot including a toothed portion for receiving a pinion gear extending from a displaceable bracket; and
    an arcuate channel for receiving a guide pin extending from the displaceable bracket for determining a path of the seatback pivot between the primary position and the secondary position, wherein, in the secondary position, the seatback is rotatable about the seatback pivot to position the seatback in a substantially flat position above the seat.

17. The seating assembly of claim 16, wherein the toothed portion is disposed on an oblong member, wherein the pinion gear extends from a motor, wherein the pinion gear extends into the slot, and wherein a fastener retains the pinion gear against the toothed portion of the oblong member.

* * * * *

UNITED STATES PATENT AND TRADEMARK OFFICE
CERTIFICATE OF CORRECTION

PATENT NO.         : 11,091,065 B2
APPLICATION NO.    : 16/735140
DATED              : August 17, 2021
INVENTOR(S)        : Aktas et al.

Page 1 of 1

It is certified that error appears in the above-identified patent and that said Letters Patent is hereby corrected as shown below:

In the Claims

Column 10:
Claim 1, Line 34;
"tear" should be --gear--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*